Dec. 15, 1964 J. SZYDLOWSKI 3,161,237
CONTROL METHOD AND SYSTEM FOR AIRCRAFT POWERPLANTS
COMPRISING A GAS TURBINE DRIVING A VARIABLE
PITCH PROPELLING DEVICE
Filed March 20, 1961 11 Sheets-Sheet 1
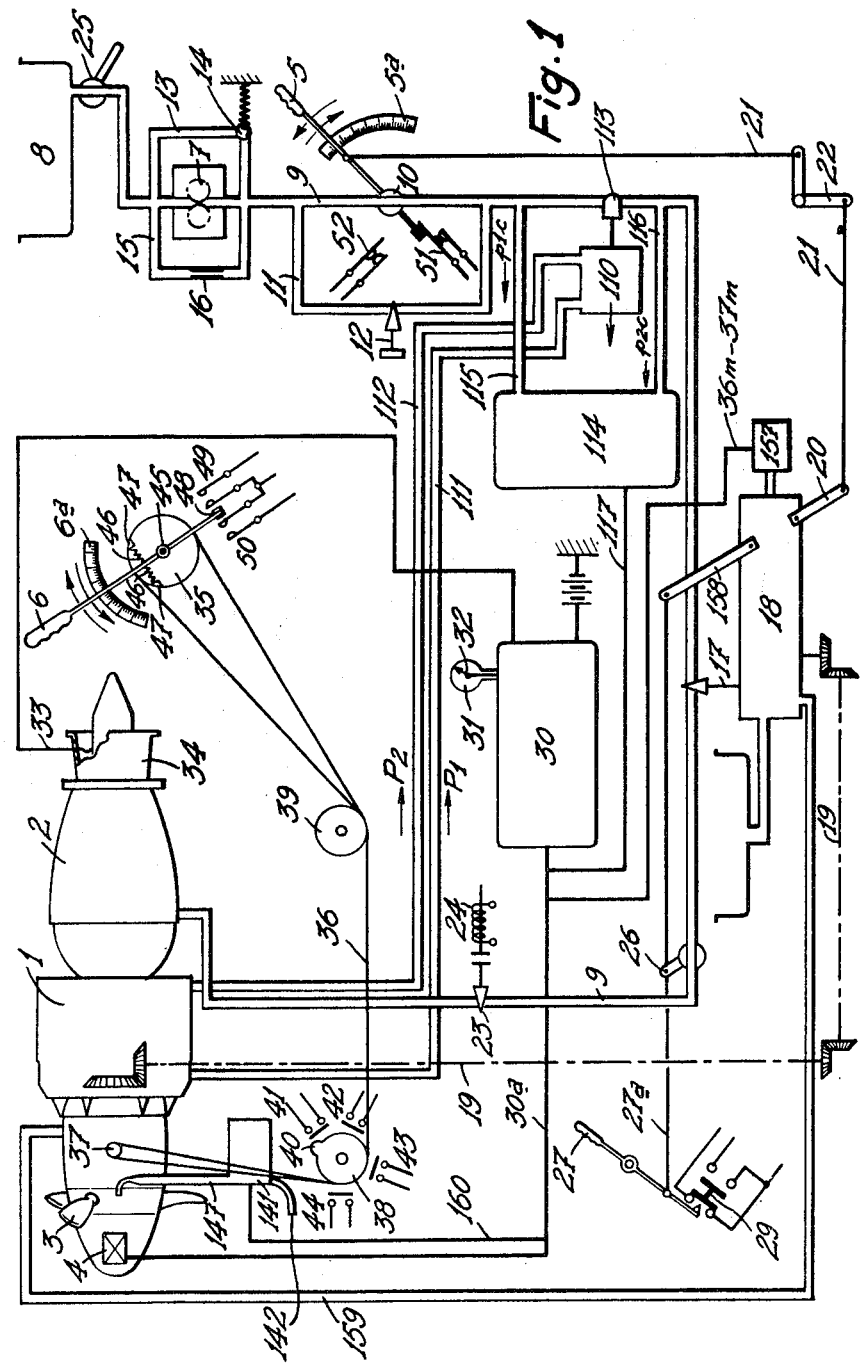

Dec. 15, 1964     J. SZYDLOWSKI     3,161,237
CONTROL METHOD AND SYSTEM FOR AIRCRAFT POWERPLANTS
COMPRISING A GAS TURBINE DRIVING A VARIABLE
PITCH PROPELLING DEVICE
Filed March 20, 1961                    11 Sheets-Sheet 2
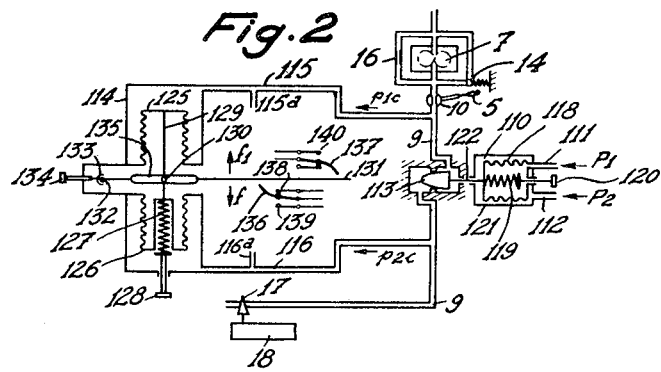
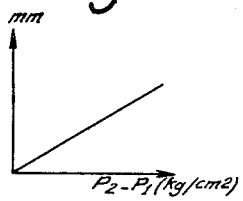
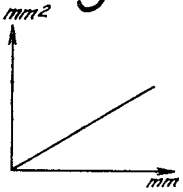
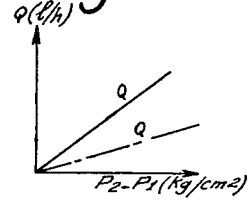
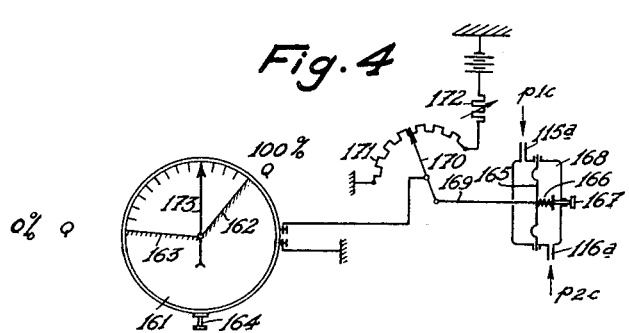

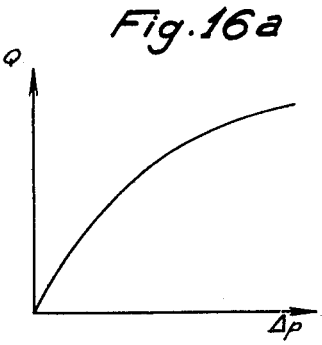
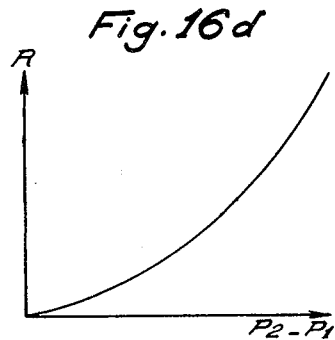
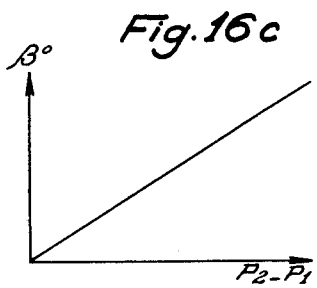
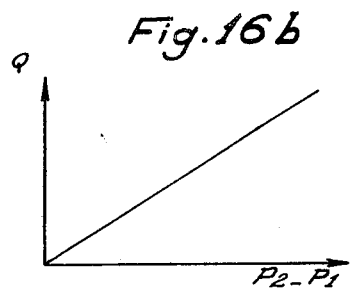
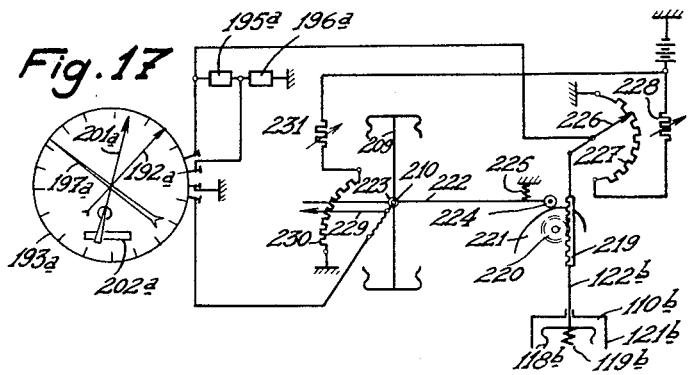
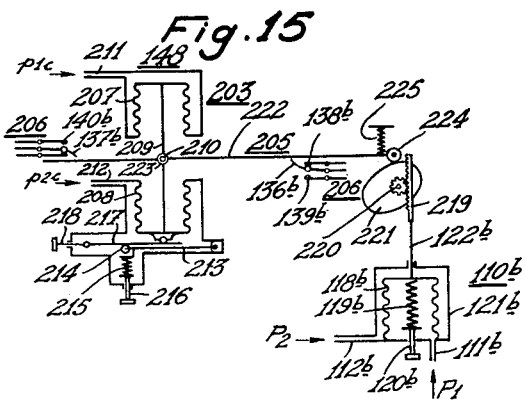

3,161,237
CONTROL METHOD AND SYSTEM FOR AIRCRAFT POWERPLANTS COMPRISING A GAS TURBINE DRIVING A VARIABLE PITCH PROPELLING DEVICE
Joseph Szydlowski, % Société Turboméca, Bordes, Basses-Pyrenees, France
Filed Mar. 20, 1961, Ser. No. 96,971
Claims priority, application France, Mar. 25, 1960, 822,429
39 Claims. (Cl. 170—135.74)

This invention relates to an improved control method and system particularly directed towards a control method and system for an aircraft powerplant comprising a gas turbine drivably connected to an aerodynamic propelling device having blades the pitch of which may be varied, examples being the pitch of a variable pitch propeller or the collective pitch of a helicopter rotor.

The invention relates, more particularly, to control methods and systems wherein turbine speed is maintained constant by a governor controlling the quantity of fuel delivered into the turbine, propeller pitch being controlled independently in relation to some parameter selected to enable it to be adjusted from the feathered position up to maximum reverse, over the whole permissible working range of the gas turbine, with due regard for the maximum permissible thermal load.

As described in U.S. patent application Ser. No. 1,600 filed by the applicant on January 11, 1960, now patent No. 3,097,700, recourse has already been had to such control methods and systems wherein the selected parameter is the temperature $t$ of the gas on entry into, or on exit from, the turbine, this parameter being used in continuous comparison with a preselected maximum permissible temperature T for that gas, whereby, through the medium of suitable electrical devices, control is achieved over the propeller pitch or the helicopter rotor collective pitch, such control being a function of the maximum permissible thermal load for the gas turbine.

Recourse has also been had to a device to prevent the turpopropeller turbine from overspeeding in the event of a dive or a steep let-down, by causing automatic setting out of the variable pitch propeller in order to increase the load on the engine, except in cases where a pitch reduction is commanded.

With a view to achieving full control turbopropellers of the type specified hereinabove while at the same time maintaining a regulation system fully adapted to a turbine-to-propeller or turbine-to-rotor form of coupling, the present invention has for its object a control method for aircraft powerplants comprising a gas turbine driveably connected to a variable pitch propeller or to a helicopter rotor, which consists in maintaining the turbine rate of revolution constant by means of a tachometric metering of the quantity of fuel delivered to the engine, simultaneously and continuously comparing, on the one hand, the actual rate of fuel flow with the theoretical maximum and minimum rates of flow that can be applied to the turbine and, on the other hand, the actual temperature of the gas on exit from the turbine with the preselected maximum permissible temperature of that gas, controlling the propeller pitch or the rotor collective pitch, either manually, without any form of mechanical stop between the minimum and maximum permissible pitches, or automatically, in terms of the result of said comparisons, and, in the case of a propeller, in effecting an automatic increasing of the pitch should the tachometric metering system become momentarily inoperative in flight, except in cases where a reduction in pitch is commanded, or should the propeller be set at zero-thrust pitch. This method ensures that the propeller pitch or the rotor collective pitch is prevented from reaching values leading to a gas temperature in excess of the maximum permissible temperature or to a rate of fuel flow greater or less than the theoretical maximum and minimum rates of flow, and, more specifically in the case of a propeller, that the blade pitch is prevented from automatically descending below the zero-thrust angle or the engine from overspeeding.

In addition to the parameter $t$, to wit the gas temperature on entry into or on exit from the turbine, the method according to the invention utilizes the Q actual parameter, namely the actual rate of fuel flow into the turbine. If $P_1$ and $P_2$ be taken to designate the total air head respectively on entry into and on exit from the compressor, $Q_{max}$ the maximum theoretical rate of flow which, for a given rate of speed, enables maximum power to be obtained without overheating or surging taking place, and $Q_{min}$ the theoretical minimum rate of flow which ensures satisfactory operation without a falling off of the rate of revolution or a degradation of the turbine, yet which provides sufficient power to secure complete safety for the aircraft, then it is notable, and the chief advantages of this invention reside therein precisely, (a) That the parameter $(P_2-P_1)$ accounts for ambient air conditions, aircraft speed, air intake duct efficiency, compressor and diffuser condition and turbine rotational speed;

(b) That the value of the parameter $(P_2-P_1)$ is instantaneous and continuous, whereas the measurement of such parameters as gas temperature on exit from the turbine may involve a slight time-lag;

(c) That the law of variation of the theoretical optimum rate of flow, referred to hereinafter as the maximum rate of flow $(Q_{max})$, in terms of the parameter $(P_2-P_1)$, is linear and therefore conducive to straight forward engineering solutions; and (d) That the theoretical minimum rate of flow $(Q_{min})$ required for the turbine is linked to the maximum rate of flow by the simple relation $$\frac{Q_{min}}{Q_{max}} = \text{constant}$$

for a given gas turbine, as experimentally ascertained by applicant. In fact the various tests made by applicant have demonstrated that the law relating a rate of flow Q to the parameter $(P_2-P_1)$ in order to obtain a determined temperature at the inlet of the turbine is of the form: $Q=K (P_2-P_1)$, K being a constant which has different values $K_{min}$ and $K_{max}$ for the precedingly specified $Q_{min}$ and $Q_{max}$, whereby:

$$\frac{Q_{min} = K_{min} (P_2 - P_1)}{Q_{max} = K_{max} (P_2 - P_1)} = \text{constant}$$

In a preferred manner of application of the method disclosed hereinabove, the maximum theoretical rate of flow for the turbine is determined in terms of the difference $(P_2-P_1)$, namely the difference between the total heads on entry into and on exit from the compressor, the actual rate of flow being determined either in terms of the difference between the fuel pressures respectively upstream and downstream of a fixed constriction in the fuel supply line to the turbine, or in terms of the cross-section of a variable constriction that fuel line, in respect of which cross-section said difference between the fuel pressures is maintained constant.

The invention further has for its object a control system for aircraft powerplants of the type referred to, which enables the method specified above to be performed and which is characterized by the fact that it comprises a first lever to control engine revolutions, acting upon a speed governor drivably connected to the turbine and designed to ensure, directly or otherwise, adjustment of the quantity of fuel delivered to the turbine in terms of the desired rate of revolution, a second lever to control the blade pitch, coupled to the propeller or rotor pitch varying system in order to permit manual control over the gas turbine and the blade pitch in terms of the desired flight conditions and, in the automatic control mode, to permit presetting of the propeller or rotor pitch, a temperature regulator comprising means both to set the maximum permissible gas temperature and to compare that temperature with the actual gas temperature, a fuel flow regulator comprising means to set the theoretical maximum rate of flow, means to compare that rate of flow with the actual rate of flow and a single dial to provide visualization of those two rates of flow and of the theoretical minimum rate of flow, said two regulators being connected to the coupling between the pitch control lever and the pitch varying system in order to limit that pitch, without any possibility of overriding action by the pilot, to the position corresponding either to equality between said two temperatures or to equality between the actual rate of fuel flow and the theoretical maximum rate of fuel flow, a device sensitive to that position of the tachometric metering device wherein it is against its closed limit stop and a device sensitive to the difference between the air head behind the propeller and the total air head clear of the disc swept by the propeller, these two devices being connected to the coupling between the pitch control lever and the pitch varying system to ensure automatic setting out of the propeller blade pitch angle when the tachometric metering device is against its closed limit stop, except in cases where a reduction in blade pitch is commanded or the propeller is set at zero-thrust pitch. The coupling between the pitch control lever, on the one hand, and, on the other hand, the pitch varying system, the temperature and fuel regulators and the devices respectively sensitive to the position of the tachometric metering device against its closed limit stop and to the propeller in its zero-thrust blade setting, as well as the links between these regulators and devices and said coupling are preferably in the form of electric circuits.

As specified in the aforementioned U.S. patent application Ser. No. 1,600 filed on January 11, 1960, the rotational speed of the turbine, once the latter has been started, remains constant under all operating conditions until the pilot stops the engine. Indeed, once the engine has gathered speed, the pilot governs the engine with a single control, which makes for very great simplicity and precludes mishandling of the controls.

Being basically electrical in design, the pitch control system adapts itself particularly well to a propeller the blade pitch of which is electrically controlled. However, it remains perfectly adaptable to any other system of blade pitch control.

Insofar as the turbine rotational speed control is concerned, this is such that it permits starting, gathering speed and regulation over a certain working range, the speed governor with its very short response time-lag allied to a high degree of stability maintaining the selected speed constant over the range of regulation. This rotational speed control is isodromic, preferably of the type described in U.S. patent application Ser. No. 714,798, now Patent No. 3,002,502, filed on February 12, 1958 by the applicant. An isodromic control comprises a distributing slide-valve adapted to feed with a liquid under pressure, on the one hand, a servo-control piston mechanically connected to a regulation control device for the fuel feed of an internal combustion engine and, on the other hand, a temporary follow-up acting piston hydraulically connected to said servo-control piston, according as the actual number of revolutions of the engine is lower or higher than the number of revolutions to be adjusted, the two faces of said temporary follow-up acting piston being interconnected through an adjustable restricted valve providing a laminar flow and being respectively connected to two chambers housing the ends of said slide-valve on which act respectively a device sensitive to the actual speed of the engine and a device sensitive to the speed to be adjusted, as described in said U.S. Patent No. 3,002,502.

Further particularities of the invention will become apparent from the following description given with reference to the accompanying drawings which are provided by way of example only and not in any limiting sense, and this description will make it clear how the invention may be put into practice. In the drawings:

FIG. 1 is a schematic overall view of a first embodiment of the mechanical portion of a turbopropeller control system according to the invention.

FIG. 2 is a schematic illustration of the means used to determine and compare the theoretical maximum and actual rates of flow in the system shown in FIG. 1.

FIG. 3a is a graph showing the theoretical maximum and minimum rates of flow plotted against the parameter $(P_2-P_1)$.

FIG. 3b is a graph in which displacement of the metering device in the system for determining the maximum flow in FIGS. 1 and 2 is plotted against the parameter $(P_2-P_1)$.

FIG. 3c is a graph wherein passageway cross-section through the metering device is plotted against displacement of the latter.

FIG. 4 is a schematic illustration of the visualization system for comparing the actual flow Q with the $Q_{max}$ and $Q_{min}$ flows in the form of percentages thereof, for the system shown in FIG. 1.

FIG. 5 is another visualization system for the system of FIG. 1.

FIG. 6 schematically illustrates an overall control system in accordance with the invention designed to detect the thrust of the propeller, i.e. to indicate whether the propeller is exerting forward thrust, reverse thrust or zero thrust, and its manner of coupling to the propeller blade pitch electric control system.

Figure 7:
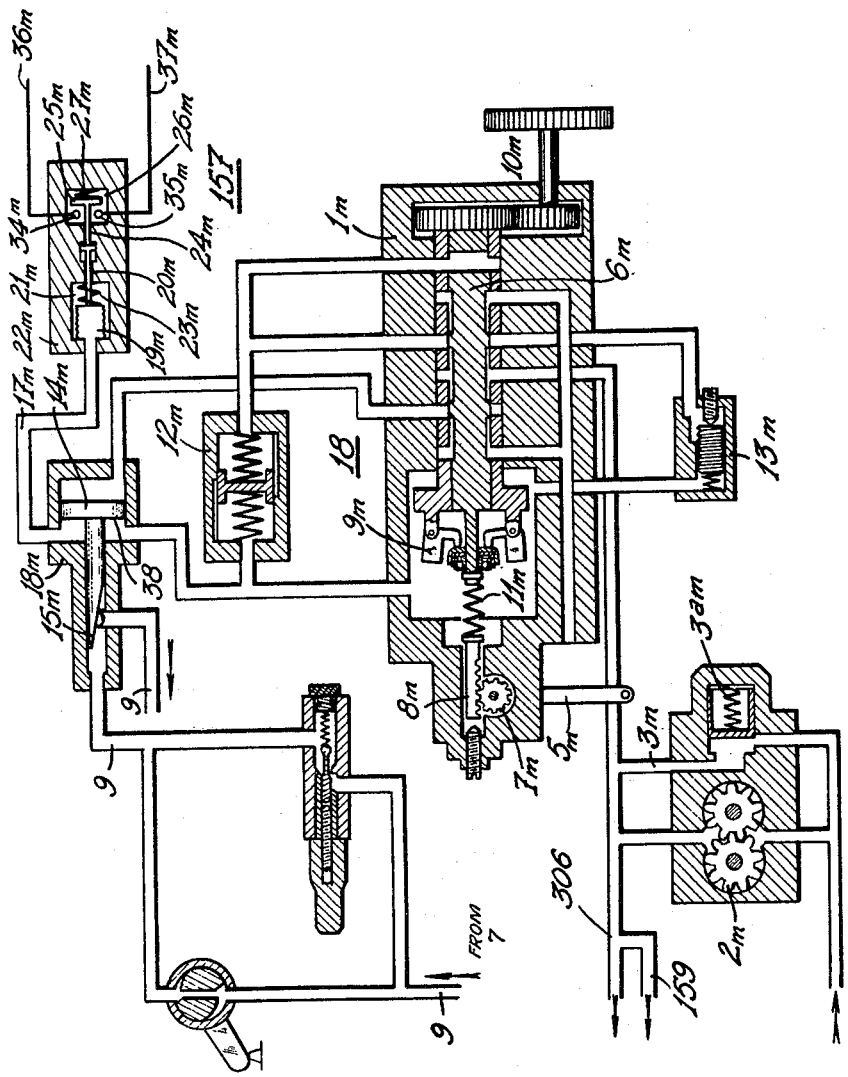

FIG. 7 is a schematic cross-sectional view of a fuel flow regulating system incorporating a safety feature to detect a zeroizing of the fuel feeding in flight, i.e. to prevent engine overspeeding, usable in an overall control system according to the invention.

Figure 8:
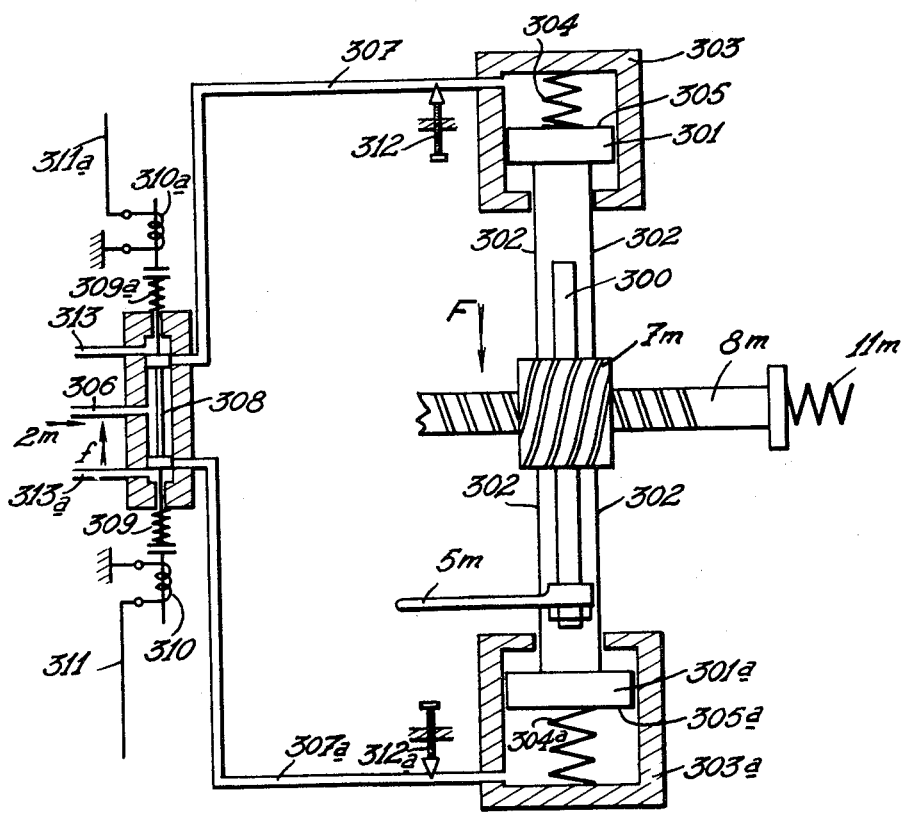

FIG. 8 is a schematic illustration of a phase lead mechanism designed to prevent fluctuations in engine speed and adaptable to the fuel flow regulating system shown in FIG. 7.

Figure 9:
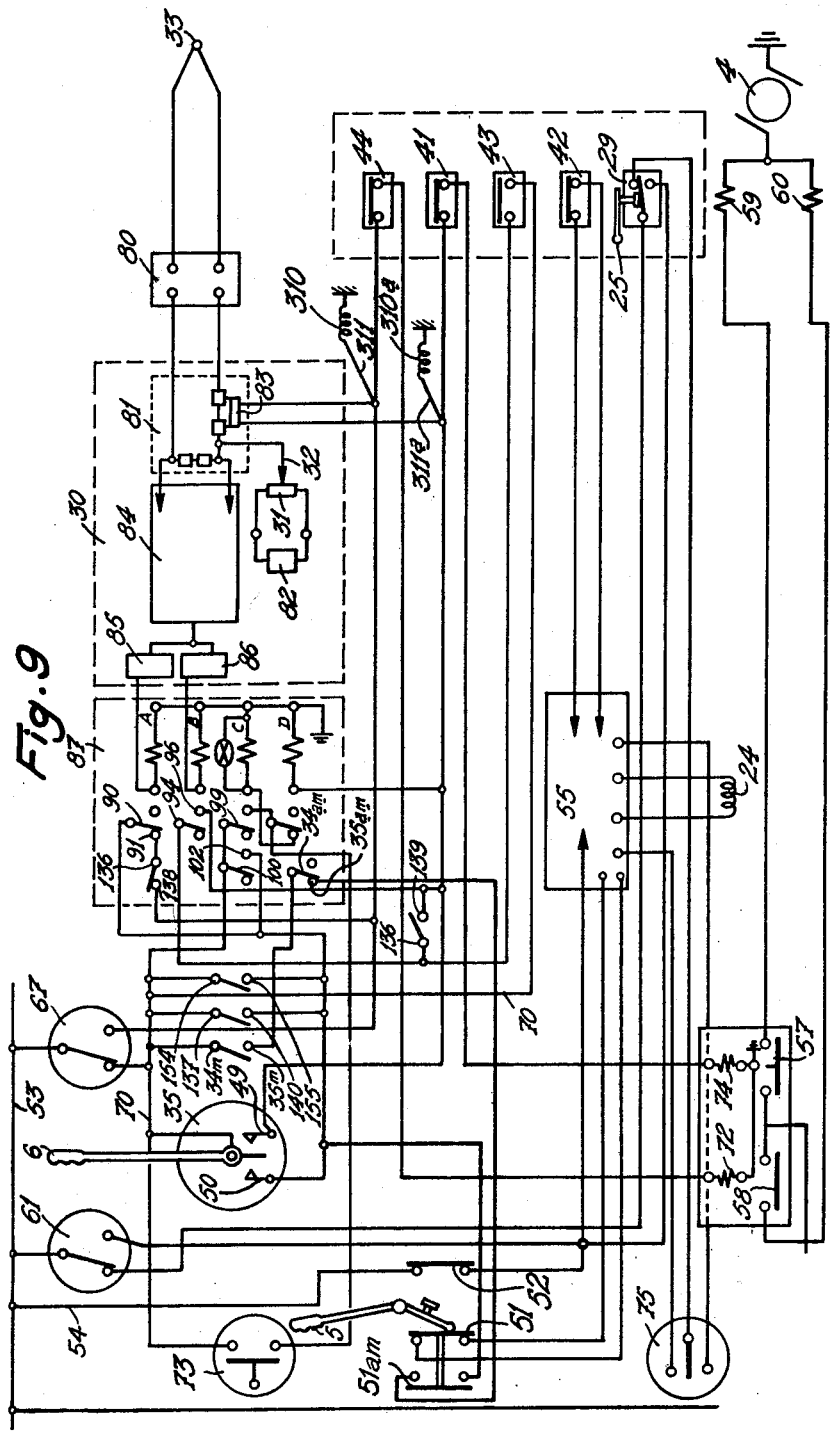

FIG. 9 is an overall view of the electrical portion of the blade pitch control system shown in FIG. 1, the powerplant being in stopped configuration and the propeller at ground zero-thrust pitch, with the aircraft at rest.

Figure 10:
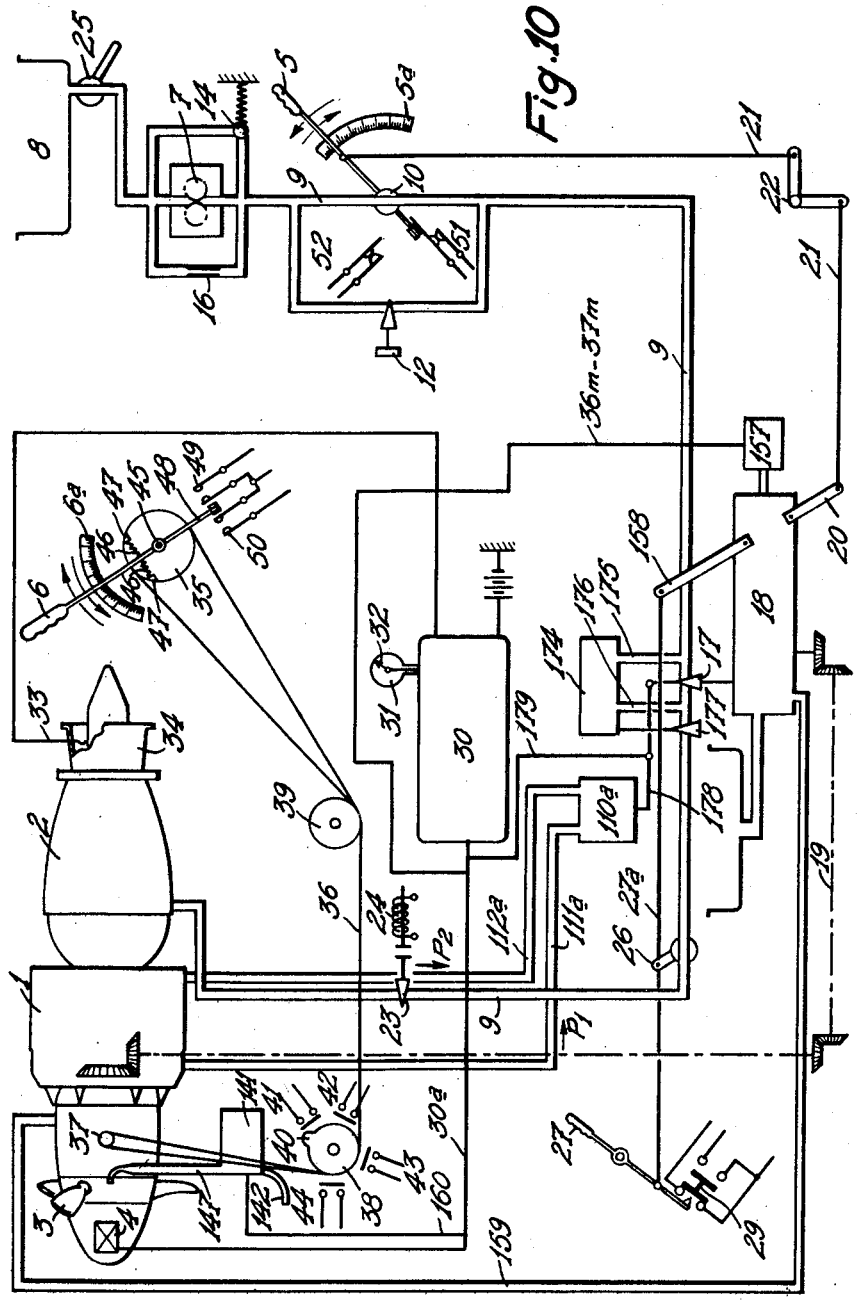

FIG. 10 is an overall schematic view of the mechanical portion of a turbopropeller control system in accordance with the invention.

Figure 11:
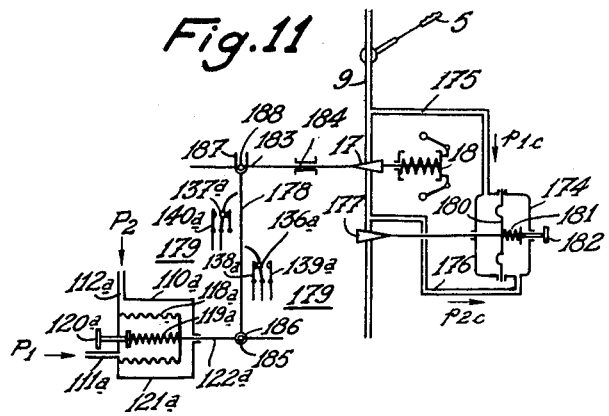

FIG. 11 is a schematic illustration of the means for determining and comparing the theoretical maximum and minimum rates of flow in the system shown in FIG. 10.

Figure 12A:
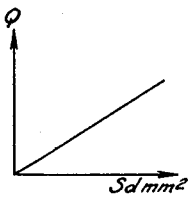

FIG. 12a is a graph showing the actual rate of flow plotted against the passageway cross-section through the servo-controlled metering device in the system illustrated in FIGS. 10 and 11, in the case of a constant fuel pressure differential across said metering device.

Figure 12B:
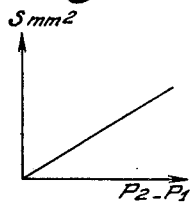

FIG. 12b is a graph in which the passageway cross-section through the servo-controlled metering device, required to obtain the $Q_{max}$ rate of flow with the constant fuel pressure differential referred to, is plotted against the parameter $(P_2-P_1)$ for the system illustrated in FIGS. 10 and 11.

Figure 12C:
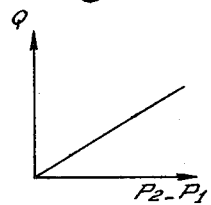

FIG. 12c is a graph showing the $Q_{max}$ rate of flow plotted against the parameter $(P_2-P_1)$.

Figure 13:
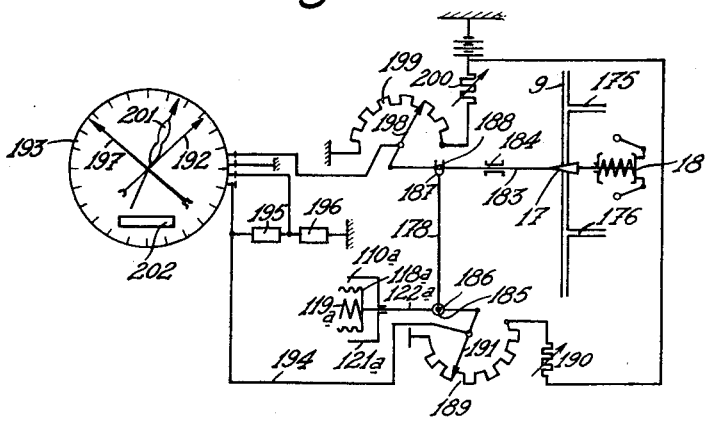

FIG. 13 is a schematic illustration of the system for visualizing determination and comparison of the $Q_{actual}$, $Q_{max}$ and $Q_{min}$ rates of flow, in the system shown in FIG. 10.

Figure 14:
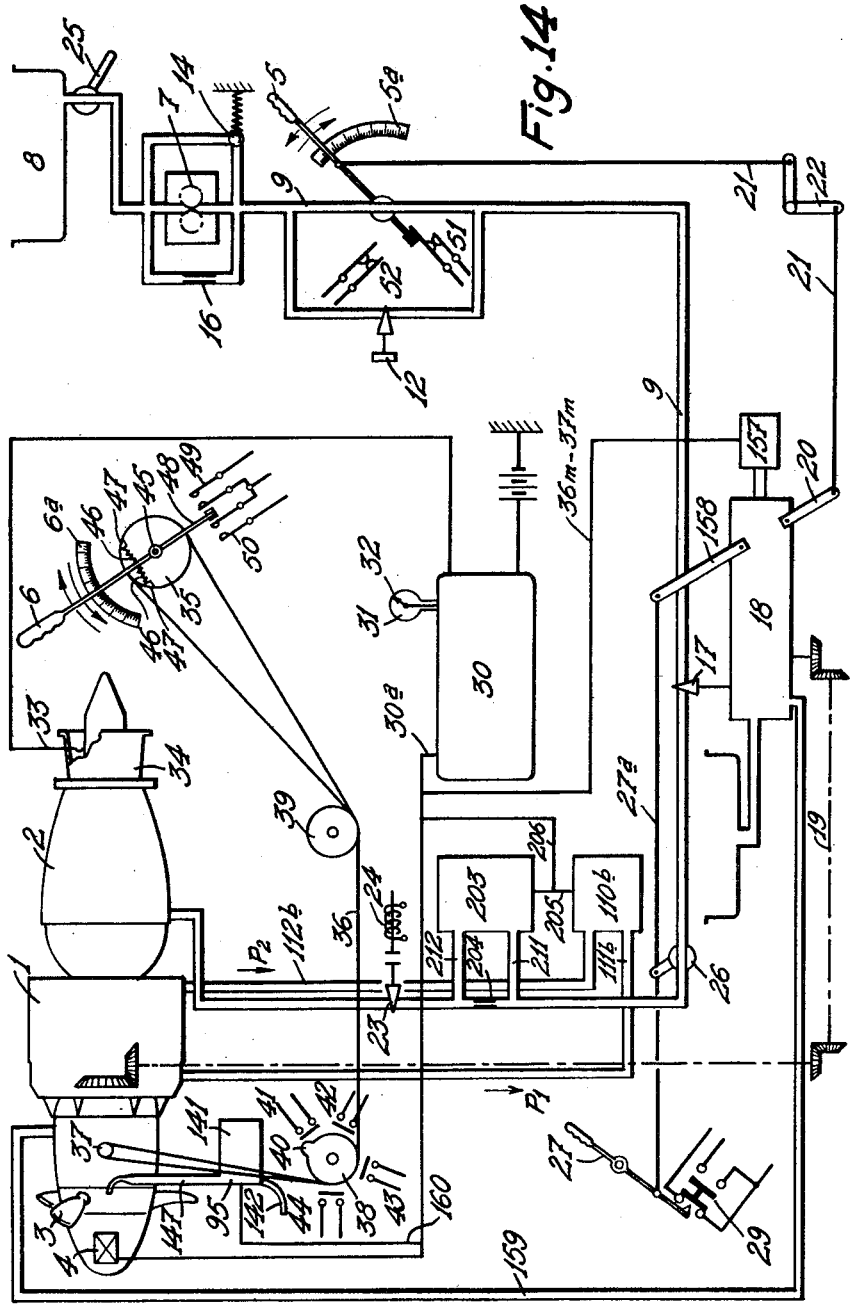

FIG. 14 is an overall schematic view of a third embodiment of the mechanical portion of a turbopropeller control system in accordance with the invention.

FIG. 15 is a schematic illustration of the means used to determine and compare the theoretical maximum and actual rates of flow in the system shown in FIG. 14.

FIG. 16a is a graph showing the actual rate of flow plotted against the pressure differential across the constriction in the system illustrated in FIG. 14.

FIG. 16b shows the $Q_{max}$ rate of flow plotted against the parameter $(P_2-P_1)$.

FIGS. 16c and 16d respectively show the angular displacement and the radius, of the cam in FIG. 15, plotted against the parameter $(P_2-P_1)$.

FIG. 17 is a schematic view of the system providing visualization of the determination and comparison of the $Q_{actual}$, $Q_{max}$ and $Q_{min}$ rates of flow in the system shown in FIG. 14.

Figure 18:
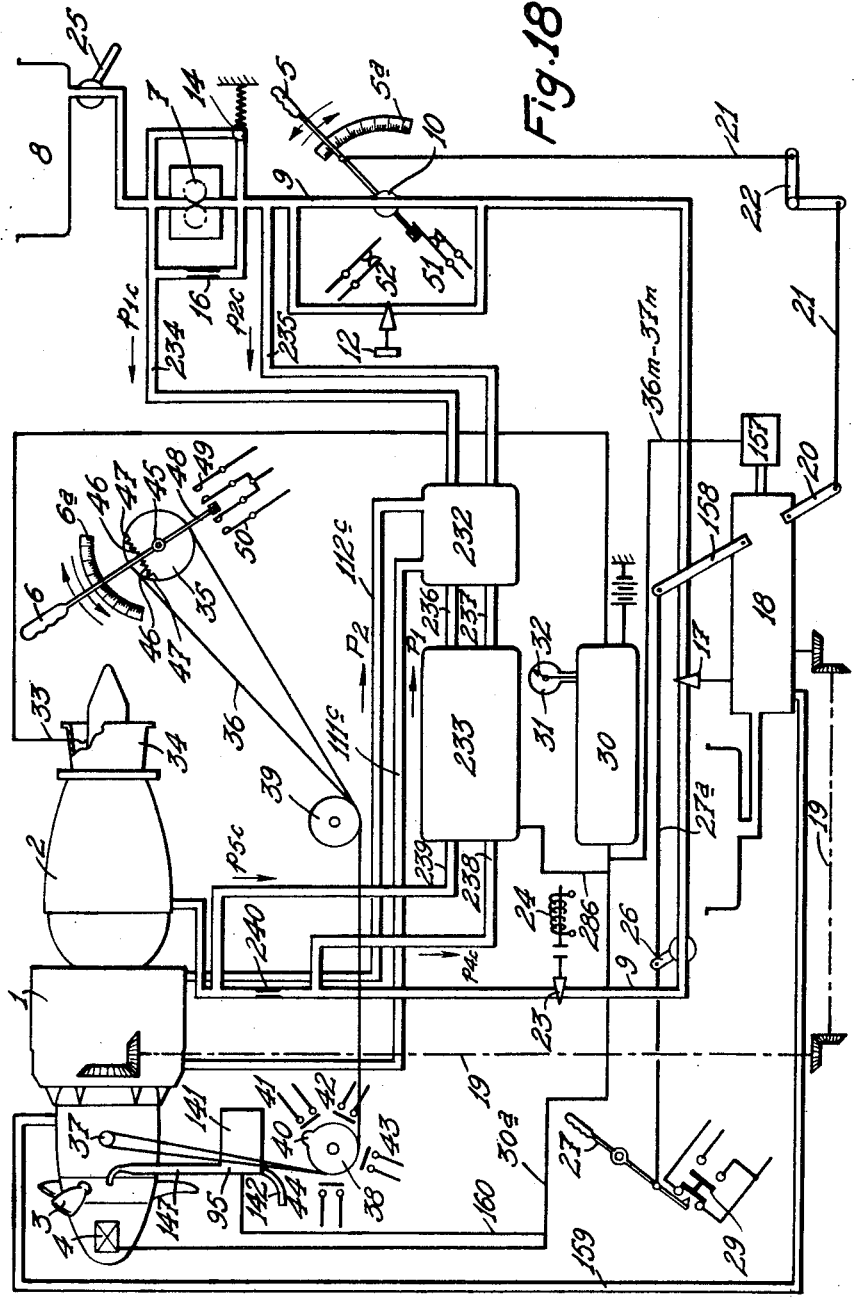

FIG. 18 is an overall schematic view of a fourth embodiment of the mechanical portion of a turbopropeller control system in accordance with the invention.

Figure 19:
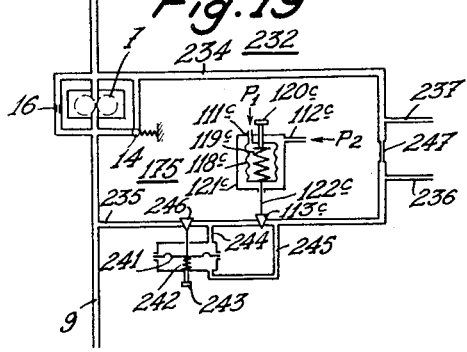

FIG. 19 is a schematic illustration of the system for determining the theoretical rate of flow shown in FIG. 18.

Figure 20:
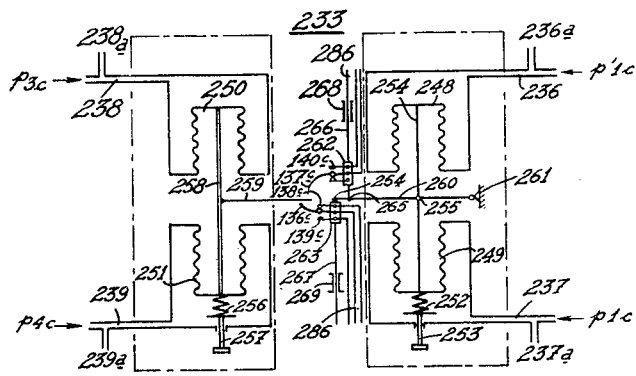

FIG. 20 is a schematic illustration of the system in FIG. 18 for comparing the actual rate of flow with the $Q_{max}$ rate of flow.

Figure 21:
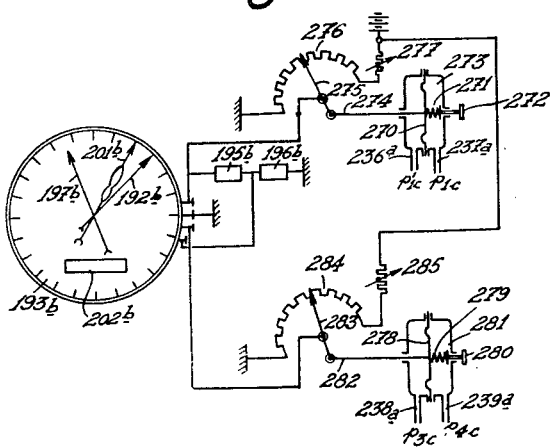

FIG. 21 is a schematic illustration of the system used in the layout of FIG. 18 for providing visualization of the determination of the $Q_{actual}$, $Q_{max}$ and $Q_{min}$ rates of flow.

Referring now to FIG. 1, the turbopropeller comprises a compressor 1, a turbine 2 and a propeller 3 with an electrically-controlled pitch-varying system of any type well known per se, controlled by an electric motor 4 provided with low pitch and high pitch circuits. The turbopropeller is controlled by means of two levers, to wit by an engine speed control or throttle lever 5 and a blade pitch control lever 6, these levers being movable along guideways 5a and 6a respectively.

The components associated to the throttle lever 5 comprise a fuel pump 7 drawing fuel from a tank 8, via a flameout cock 25, and delivering it into a conduit 9 in which is interposed a cock 10 operated by the lever 5 and equipped with a by-pass 11 and an adjustable idling speed jet 12. The pump itself comprises a by-pass 13 with adjusting valve 14 and a by-pass 15 embodying a constriction 16. Into the conduit 9 is inserted a fuel flow metering device 17 the degree of opening of which is controlled by a tachometric unit 18 coupled to the turbine through an appropriate drive 19. The rotational speed setting lever 20 is connected to the cock 10 by a suitable linkage 21 and a bell-crank 22, the complete assembly being controlled by the lever 5. The conduit 9 downstream of the metering device 17 leads up to the fuel injector nozzles of the turbine and is equipped with a master cut-off valve 23 which is electrically operated in response to an electromagnetic device 24. A manually operated flame-out cock 26 is fitted between the metering device 17 and the electric valve 23. This manually operated flame-out cock 26 is operatively connected to a lever 27 through a suitable mechanical drive 27a. The lever 27 acts upon a reversing switch 29 which, through the medium of a starting box 55 (FIG. 9), causes the electric valve 23 to close when the propeller is hydraulically feathered. Since the starting box does not fall within the scope of the invention, it will not be described.

A device 110, which senses, via passageways 111 and 112, the air pressures $P_1$ and $P_2$ on entry into and on exit from the compressor 1, controls the displacement of a metering device 113 inserted into the conduit 9 between the cock 10 and the metering device 17. The fuel pressures $p_{1c}$ and $p_{2c}$ upstream and downstream of metering device 113 are communicated to a comparator 114 via passageways 115 and 116 respectively. The comparator 114 is electrically connected via a cluster 117 to the circuits 30a used for coupling the temperature regulator 30 and the pitch control lever 6 to the blade pitch varying motor 4.

Blade pitch control for the variable pitch propeller 3 is ensured by the electric motor 4 mounted underneath the propeller spinner, and this motor receives its commands from either the comparator 114, the temperature regulator 30, the devices 141 and 157 described hereinbelow, or the pitch control lever 6, depending on the mode of operation. The temperature regulator 30 comprises a potentiometer 31 the slider 32 of which serves to set the temperature T which is not to be exceeded by the gas on exit from the turbine. One or more thermocouples 22 positioned inside the turbine exhaust nozzle 34 provide the temperature regulator 30 with indications of the actual temperature $t$ of the gas as it exhausts from the turbine.

The blade pitch variations are transmitted to the pitch control lever 6 which carries a disc 35, and are indicated on the guide 6a by means of a cable system 36 operating in conjunction with pulleys 37, 38 and 39. The pulley 38 carries a cam 40 the purpose of which is to operate four microswitches 41, 42, 43 and 44.

The pitch control lever 6, which is fitted to the shaft 45 carrying the disc 35 with slight friction, is rotatably united thereto, when no manual action is exerted upon the lever, through the medium of two springs 46 bearing against two stops 47 carried by the disc. The lever 6 carries an extension 48 the purpose of which is to close normally-open contacts 49 and 50 inserted into the low and high-pitch circuits respectively of the motor 4.

The throttle lever 5 acts upon two contacts 51 and 52 which are inserted into the circuit of the starting box 55 and which, once both are closed, enable the turbine to be started.

As shown in FIG. 2, the device 110 comprises a capsule 118, against the end of which thrusts a spring 119 adjustably tensioned by a screw 120 and to the interior of which is communicated the air pressure $P_1$ via the passageway 111. This capsule 118 is enclosed in a chamber 121 into the interior of which the air pressure $P_2$ is communicated through the passageway 112. A rod 122 fixed to the end of capsule 118 carries, on its free end, the metering device 113 inserted into the conduit 9. Deformations of the capsule 118 in response to the pressure differential $$(P_2-P_1)$$

which it sustains cause linear displacements of the metering device 113 proportional to the value of $(P_2-P_1)$ and hence to the value of $Q_{max}$. Two pipes 115 and 116 tapped off the conduit 9 respectively communicate, to the comparator 114, the fuel pressure $p_{1c}$ prevailing upstream of the metering device 113, and the fuel pressure $p_{2c}$ prevailing downstream of the latter and upstream of the metering device 17 of tachometric regulator 18. This comparator consists of two capsules 125 and 126, the former receiving the pressure $p_{1c}$ and the latter the pressure $p_{2c}$. Capsule 126 comprises a spring 127 fitted with a tensioning screw 128. The ends of capsules 125 and 126 are connected together by a rod 129 onto which is fixed a pin 130. A beam lever 131, one end of which is fitted with a head 132 swivelling in a yoke 133, the position of which is adjustable by means of a screw 134, incorporates a slot or slideway 135 into which engages the pin 130.

Two travelling contacts 136 and 137 are positioned on either side of the beam lever 131. Two fixed contacts 138 and 139 flank the contact 136, and a fixed contact 140 is positioned in proximity to the contact 137. The ratio between the respective distances of contacts 136 and 137 from the head 132 is identical to the ratio between the $Q_{max}$ and $Q_{min}$ values.

The manner of operation of the above system, to be described in detail later, is based upon the following principles:

(1) Variations in the theoretical maximum rate of flow $Q_{max}$ and in the minimum permissible rate of flow $Q_{min}$ are proportional to the variations in $(P_2-P_1)$, as shown in FIG. 3a.

(2) Displacements of the metering device 113 are proportional to the variations in the parameter $(P_2-P_1)$, as shown in FIG. 3b.

(3) The law of variations of the passageway cross-section through the metering device 113 in terms of displacement of the latter is shown in FIG. 3c.

(4) The rate of fuel flow through the conduit 9, according to the section determined by the position of metering device 113, is equal to the $Q_{max}$ rate of flow when the fuel pressure differential $\Delta p_c$ across the metering device 113 is equal to a preset value.

(5) The $Q_{actual}$ rate of fuel flow through the conduit 9, according to the section determined by the position of metering device 113, is a direct function of the pressure differential $\Delta p_c$ across the metering device 113.

(6) Displacements of the pin 130 of comparator 114 are proportional to variations in $\Delta p_c$ and therefore proportional also to variations in the $Q_{actual}$ rate of flow.

In view of the foregoing, joint operation of systems 110 and 114 is as follows:

The metering device 113 is positioned in terms of the value $(P_2-P_1)$ and determined a section offered for passage of the fuel through the conduit 9 such that the rate of flow through it is equal to $Q_{max}$, provided the $\Delta p_c$ is exactly equal to the preset value. In this configuration, the beam lever 131 is maintained in the position shown in FIG. 2. If, with $(P_2-P_1)$ remaining constant, the $\Delta p_c$ increases, the beam lever 131 moves in the direction of the arrow $f$, and this indicates that the $Q_{actual}$ rate of flow is tending to exceed the $Q_{max}$ rate of flow. Conversely, if the $\Delta p_c$ decreases, the balance lever 131 moves in the direction of the arrow $f_1$, indicating that the $Q_{actual}$ rate of flow is decreasing relative to the $Q_{max}$ rate. The amplitude of the displacements of beam lever 131 is proportional to the variation in the $Q_{actual}$ rate of flow relative to the $Q_{max}$ rate. The various contacts mounted on either side of the beam lever 131 fulfil the following functions:

(1) When contacts 136, 138 are closed, the propeller blade pitch can be increased automatically or manually, or else be decreased manually only.

(2) When contacts 136, 139 are closed, the propeller blade pitch decreases automatically until contacts 136, 138 are closed once more.

(3) When contacts 137, 140 are open, the blade pitch can be decreased automatically or manually.

(4) When contacts 137, 140 are closed, the blade pitch increases automatically at least until these contacts open again.

A device 141 for detecting the thrust of the propeller, shown in FIG. 6, permits measurement of the difference between the air head $P_h$ behind the propeller and the total head $P_{h1}$ clear of the disc swept by the propeller, both these heads being sensed by Pitot tubes. As long as the difference $(P_h-P_{h1})$ is positive, the propeller exerts forward thrust; when it is equal to zero, the propeller is set at zero-thrust blade pitch and, if it is negative, the propeller exerts reverse thrust. The head $P_{h1}$ is communicated via a passageway 142 to a capsule 143 fitted with a spring 144 and a tensioning screw 145 therefor, said capsule being housed in an enclosure 146 to which is communicated via the passageway 147, the pressure $P_h$ sampled behind the propeller. The rod 148 fixed to the end of capsule 143 transmits, through a bell-crank 149 and a link-rod 150, the deformations sustained by capsule 143 to a pointer 151 which travels round a dial 152 graduated in algebraic values of $(P_h-P_{h1})$.

The end of rod 148 carries thereon a tongue 153 which, when the value $(P_h-P_{h1})$ is equal to zero, establishes contact between the arm 154 and the fixed contact 155 and closes the pitch increase control circuit (hereafter referred to as the "high-pitch circuit") and which, in fact, act as a substitute for the contacts 137, 140 of FIG. 2 if $(P_h-P_{h1})$ becomes equal to zero before the $Q_{actual}$ rate of flow has reached a value equal to $Q_{min}$. When the value $(P_h-P_{h1})$ is positive, the tongue 153 leaves the arm 154, whereupon the latter comes to bear against its resting contact 156, thereby arresting automatic pitch coarsening. Contacts 154, 155 are connected by a cluster 160 to the circuits 30a used to couple the temperature regulator 30 and the pitch control lever 6 to the actuating motor 4 of the blade pitch varying system.

If the pressure $P_{h1}$ is sampled at the entry of the intake duct of compressor 1, it will be equal to the pressure $P_1$ defined precedingly.

FIG. 7 shows a rotational speed regulating device 18 of the type described in the aforementioned U.S. patent application Ser. No. 714,798, now Patent No. 3,002,502, equipped with an overspeed safety device 157 or device for detecting a zeroizing of the fuel feeding in flight.

The device incorporating the isodrome regulator comprises a distributor $1m$ which is fed by an oil pump $2m$ incorporating a by-pass $3m$ and a regulating valve $3am$ and in which is displaceable a slide valve $6m$ sustaining, on the one hand, the action of the throttle lever $5m$ via a pinion $7m$ and a rack $8m$ and, on the other, that of governor weights $9m$ driven by the transmission $10m$ coupled to the turbine, a spring $11m$ being interposed between the rack and the slide valve. The distributor is connected to an isodromic piston $12m$ and to a compensation valve $13m$ providing laminar flow. The isodromic piston actuates an operative or servo-control piston $14m$ the stem $15m$ of which is provided with a tapered controlling section inserted into the conduit 9 leading from the fuel pump 7 to the turbine injector nozzles, said stem acting as a fuel metering device.

A passageway $17m$, tapped off the housing $18m$ in which travels the servo-controlled operative piston $14m$, leads the oil pressure exerted on the face 38 of this piston, which is connected to the metering device $15m$, to the interior of a capsule $19m$ to the end of which is welded a pushrod $20m$.

This capsule $19m$ is housed in a chamber $21m$ provided in a body $22m$. A spring $23m$ is inserted between the end of the capsule remote from that communicating with the passageway $17m$ and the bottom of chamber $21m$. The pushrod $20m$ acts upon the stem $24m$ of an electrically conductive plate $25m$ housed in a chamber $26m$ in the body $22m$ and biased towards said pushrod by a spring $27m$. In the chamber $26m$ are arranged two contacts $34m$ and $35m$ which are connected, directly or otherwise, by conductors $36m$ and $37m$ to the high pitch field winding of the actuating motor in the propeller pitch varying system.

When, in the event of a steep let-down or a dive, the servo-control oil pressure acting against the face 38 of piston $14m$ connected to metering device $15m$ drops to zero, thereby fetching the metering device against its closed limit stop, the spring $23m$ crushes the capsule $19m$. At the same time, the spring $27m$ thrusts the mobile plate $25m$ up to the contacts $34m$ and $35m$, thereby closing the circuit which directly or indirectly energizes the pitch varying system to provide pitch coarsening.

Closure of contacts $34m$, $35m$ by mobile plate $25m$, namely when the metering device $15m$ reaches its closed limit stop, causes automatic pitch coarsening until this metering device begins to open once more, that is to say until the isodrome regulator becomes operative again, unless a pitch reduction is commanded.

Contacts $34m$, $35m$ are connected, via the cluster $36m$, $37m$, to the circuits 30a respectively coupling the temperature regulator box 30 and the pitch control lever 6 to the actuating motor 4 of the pitch varying system. The regulating system additionally comprises a pressure bleed controlled by a lever 158 which is connected to the flame-out cock 26 through the transmission line 27a and which operates a cock mounted on the tachometric regulator 18 which, when open, enables oil under pressure to be delivered to the propeller 3 via the line 159, providing the turbine is still rotating so that oil pressure may prevail in the regulator 18. The pilot can therefore feather the propeller in an emergency by operating the lever 27 if the propeller is designed accordingly.

In order to avoid engine speed fluctuations due to turbine inertia when blade pitch changes are commanded by the devices described hereinabove, it is indispensable for the latter to be supplemented by a phase lead mechanism designed to modify the position of the isodrome regulator metering device in the appropriate direction in order to modify the rate of fuel flow, when a pitch change command is made, without waiting for the other regulating components to respond, and in such a way as to ensure that turbine rate of revolution remains steady.

It is necessary to this end, when blade pitch changes are commanded, to cause the tension in the techometric regulator spring 11m to vary in the required sense by an amount such that the metering device 15m is caused to move so as to predetermine a rate of fuel flow which will prevent the change in turbine speed that would otherwise take place when the pitch change command is executed.

As shown in FIG. 8, the phase lead mechanism is constituted in the following manner. The governed-speed-setting-pinion 7m is provided with helical teeth and is slidable along its drive shaft 300, the latter being rotatable by means of a lever 5m. The rack 8m meshing with pinion 7m is likewise provided with helical teeth. Any travel motion by pinion 7m along its shaft causes longitudinal displacement of the rack 8m, the result of which is to cause the tension in spring 11m to be varied in the same way as would be caused by operation of lever 5m.

Travel motion of the pinion 7m in the appropriate direction is provoked automatically as soon as either the pitch increasing or the pitch decreasing circuit of the propeller is energized, either automatically or through operation of the pitch control lever, by a hydraulic device comprising two pistons 301 and 301a respectively coupled to either side of pinion 7m by struts 302 in such a way as to permit angular travel of the lever 5m. The pistons 301 and 301a are mounted in housings 303 and 303a. Springs 304 and 304a, inserted between the pistons 301 and 301a and the ends of their respective housings, serve to equilibrate the system. The piston faces 305 and 305a, respectively acted upon by springs 304 and 304a, receive the oil under pressure delivered by the pump 2m via passageways 306 and 307 or 307a.

A distributor 308, maintained in equilibrium by springs 309 and 309a, almost completely obturates the orifice of passageways 307 and 307a, yet permits slight communication of the latter with return passageways 313 and 313a to the reservoir. Two electromagnets 310 and 310a are designed to displace the distributor 308 in one direction or the other, thereby placing one or the other of passageways 307 or 307a in communication with passgeway 306. Electromagnet 310 is connected by an electric line 311 to the high pitch circuit of the temperature regulator, while a line 311a connects electromagnet 310a to the low pitch circuit of that regulator. Two adjustable metering devices 312 and 312a are inserted into passageways 307 and 307a respectively.

Operation of this system takes place as follows:

When the pilot or the regulating systems described precedingly command an increase in pitch, say, the electromagnet 310, which is energized by the high pitch circuit of the temperature regulator, displaces the distributor in the direction of the arrow f, thereby placing the passageways 306 and 307 in communication. The oil pressure delivered by the pump 3m is exerted against the face 305 of the piston 301. The compound consisting of pistons 301 and 301a and pinion 7m then moves in the direction of the arrow F, as a result of which the rack 8m is translated in the direction tending to compress the spring 11m, thereby setting a speed to be governed which is higher than that set by the position of the lever 5m. During its motion in the direction of arrow f, the metering device 308 places the passageway 307a in communication with the passageway 313a, thereby enabling the oil behind the piston 301a to return to the reservoir.

As soon as the pitch stops increasing, the electromagnet 310 ceases to be energized, whereupon the metering device 308 reverts to its position of equilibrium, the spring 304a relaxes and thrusts the compound consisting of pistons 301 and 301a and of pinion 7m back to its initial position, and the tachometric regulator slide valve 6m returns into position to govern the speed set by the lever 5m. This return to the initial position takes place at a speed determined by the setting given to the metering device 312. Restoration of communication between passageways 307 and 313 enables the oil behind piston 301 to return to the reservoir.

In the case of a pitch reduction command, the distributor is thrust in the opposite direction to arrow f and, by the same process as that described above, causes the rack 8m to be positioned for a lower governed speed than that set by the position of the lever 5m.

The electro-mechanical equipment illustrated in FIG. 9 is similar to that shown in FIG. 2 of the aforementioned U.S. patent application Ser. No. 1,600. The said electro-mechanical equipment comprises a main line 53 which is supplied by a source of current and to which is connected a line 54 leading to the main starting circuits 55, a contact 52 being inserted in said line 54. A second line, connected to the line 53, is led to two fixed contact points of two relays 57 and 58, and these contact points are respectively connected to the two other fixed contact points of said relays, via the travelling arms thereof, the latter fixed contact points being respectively connected to the low pitch field winding 59 and the high pitch field winding 60 of the motor 4. A reversing switch 61 has its travelling arm connected to the line 53, its two fixed contact points being respectively connected to the travelling arm of the reversing switch 29 and to one of the fixed contact points thereof.

A second reversing switch 67 has its travelling arm connected to the line 53. One of its fixed contact points is connected to a general control line 70 and its other fixed contact point to a feathering microswitch 44 which is in turn connected to the winding 72 of the high pitch control relay 58. The line 70 is connected to the pitch control lever 6 and leads, on the one hand, to a G pitch microswitch 43 and, on the other, to a normally-open automaticity button 73, which, as disclosed in said U.S. patent application Serial No. 1,600, acts when closed as a means for automatically bringing the turbine to its maximum power under the control of the temperature comparing means.

A reverse microswitch 41 is inserted between the contact point 49 of pitch control lever 6 and the winding 74 of low pitch control relay 57. The windings 72 and 74 are earthed.

A g pitch microswitch 42 is connected to the main starting circuits 55. The pitch g is the zero-thrust pitch while G is a positive pitch greater than g.

A three-way commutator switch 75 has its travelling arm connected to the second fixed contact point of the reversing switch 29, and its fixed contact points are connected to the main starting circuits 55, to which is further connected the control winding 24 of the electric valve. The contact 51, which is a safety contact for closure of the cock 10, is inserted into a circuit leading up to the main starting circuits 55.

The thermocouple or thermocouples 33 are connected, through the medium of a cold-end thermal corrector 80, to a summator 81 housed in the temperature regulator box 30. This summator is connected to slider 32 of the potentiometer 31 the purpose of which is to set the maximum permissible temperature T and the extremities of which are connected to an equalized-potential source 82.

A resistance-capacity circuit 83, which is energized by each manual or automatic pitch command, furnishes a follow-up voltage which, introduced into the summator 81, prevents an oscillation in the system as a whole. The summator 81 feeds an amplifier 84 which, through the medium of two multivibrators 85 and 86, supplies to a switching box 87 a voltage which is the result of the comparison made in summator 81 between the voltage supplied by the thermocouple or thermocouples 33 under the action of the actual gas temperature $t$ and that furnished by the potentiometer 31 which is in correspondence with the selected temperature T.

This switching box comprises four relays A, B, C and D. Relay A has thereon a winding which is connected to the multivibrator 85 and this winding acts upon a travelling arm 90 connected to the contact 50 and causes it to move, from a fixed contact point 91 connected to the feathering microswitch 44, to a dummy operative contact point. Relay B comprises a winding which is connected to the multivibrator 86 and which serves to move a travelling arm 94, connected to the G pitch microswitch $g$ 43, between a dummy contact point and an operative contact point 96 connected to the contact 49 and to the reverse microswitch 41.

Relay C comprises a winding connected to resting contact of relay D. This winding actuates two travelling contacts 99 and 100 connected to the line 70, moving the latter onto an operative contact 102 connected to contact 50 and to travelling contact 90, the former onto an operative contact connected to the travelling arm of relay D and to the automaticity button 73. The winding of relay D is connected to contact 49 and to reverse microswitch 41, and causes travelling arm of said relay D to move from its resting contact to its operative dummy contact. An indicator light is connected across the terminals of the winding of relay C.

Propeller pitch variations are transmitted to the pitch control lever 6 through the cable system 36 and the pulleys 37 to 39, or by any other suitable mechanical means, torsion bars being an example.

Acted upon by the cam 40, (a) The microswitch 41 has its contact open when the propeller is at maximum reverse pitch, and closed over the pitch range extending from maximum reverse to feathered;

(b) The microswitch 42 has its contact closed only at $g$-pitch, which is the zero-thrust pitch providing a braking effect that exactly offsets the turbine residual thrust at take-off engine r.p.m., under static conditions;

(c) The microswitch 43 has its contact open between maximum reverse pitch and G-pitch, the latter pitch being higher than $g$, and closed between G-pitch and feathered;

(d) The microswitch 44 has its contact closed from maximum reverse pitch onwards and opened when the propeller reaches the feathered position.

It is to be noted that, as described in the aforementioned U.S. patent application filed on January 11, 1960, the temperature regulator box 30 and the switching box 87 associated to this electro-mechanical equipment fulfil, in terms of the maximum permissible temperature T for the gas exiting from the turbine, which temperature is set by the slider 32 of potentiometer 31, the following four when the pilot presses the automaticity button which induces the self-energization of relay C through its travelling contact 99 functions:

(1) Automatic maximum powering of the turbine, i.e., automatic increasing of the blade pitch angle up to a value for which the turbine furnishes its maximum power, with due regard for prevailing flight conditions.

(2) Breaking off of the automatic maximum powering, either through overstepping of the set maximum permissible temperature T or through a manual reduction of the pitch.

(3) In the manual or the automatic control mode, blocking of the pitch control lever 6 in the direction of pitch coarsening when the maximum permissible temperature T is reached.

(4) In the event of overstepping of the maximum permissible temperature T, automatic reduction of the blade pitch angle until a true temperature $t$ less than T is restored or until a predetermined minimum pitch G is reached (12 centesimal degress for certain propellers).

The overspeed safety device requires the use of the contacts 34$m$ and 35$m$, operation of which is linked to the position of the tachometric regulator metering device 15$m$, of supplementary contacts 34$am$ and 35$am$ for the relay D to cut off the supply to the automatic maximum powering relay C, and of a contact 51$am$ which is linked mechanically to the safety contact 51 which secures the throttle lever 5 in the closed position. These three contacts 34$m$–35$m$, 34$am$–35$am$ and 51$am$ are inserted in series into a circuit which is shunted across the general control line 70 and the line connecting the normally-open contact 50 operated by the pitch control lever 6 to the travelling arm 90 of relay A, said relay A being used to cut off automatic or manual energizing of the high pitch field winding which is supplied by the multivibrator 85 associated to the actual turbine exit temperature $t$ which is equal to the maximum chosen temperature T for exit from said turbine.

The contacts 34$m$–35$m$ remain open as long as the metering device 15$m$ has not reached its closed limit stop. The contacts 34$am$–35$am$ remain closed as long as the relay D has not been switched in, that is to say as long as no manual or automatic pitch reduction has been commanded. The contact 51$am$ is open when the throttle lever 5 is in the closed position and closes as soon as said lever begins to open.

When the turbine is started, the lever 5 is kept in the closed position until cruise r.p.m. is reached. Furthermore, at the beginning of the starting operation, the metering device 15$m$ will be against its closed limit stop following upon the previous engine shut-down, and the contacts 34$m$–35$m$ will be closed. The lever 5 being closed, the open contact 51$am$ cuts out the high pitch circuit via contacts 34$m$–35$m$ during the engine starting phase, this being a phase during which it is vital that the blade pitch should not increase.

During an aircraft manoeuvre in flight, resulting in the tachometric regulator metering device 15$m$ being fetched against its closed limit stop without any manual or automatic pitch reduction having been commanded, closure of contacts 34$m$–35$m$, as the result of nullification of the pressure exerted against the face 38 of operative piston 14$m$, provokes automatic increasing of the propeller blade pitch until the metering device begins to open once more, whether the automatic powering button 73 is closed or not. The sets of contacts 51$am$ and 34$am$–35$am$ being both closed, the coil 72 of the high pitch relay 58 is then energized via the circuit formed by: common line 53; reversing switch 67; line 70; closed contacts 34$m$–35$m$; closed contacts 34$am$–35$am$; closed contact 51$am$; travelling arm 90 against resting contact 91; closed feathering microswitch 44; winding 72; earth. Switching in of the relay 58 provokes energizing, via the line 53, of the pitch increasing field winding 60 of the motor 4 until either of the sets of contacts 34$m$–35$m$ or 34$am$–35$am$ opens, that is to say when the metering device 15$m$ has begun to open once more or when the temperature $t$ of the gas exiting from the turbine exceeds the selected maximum temperature T set up on the potentiometer 31, thereby tripping in the relays B and D.

This action of the sets of contacts 51$am$, 34$m$—35$m$ and 34$am$—35$am$ supplements those of the various other control members shown in FIG. 9 without in any way affecting their operation. In particular, should the temperature $t$ of the gas on exit from the turbine, as measured by the thermocouples 33, reach the value T preset on the potentiometer 31, the resulting tripping in of the relay A which fetches the travelling arm 90 onto the operative contact point 91 precludes, during that time, the possibility of any setting of the pitch varying system in operation in the direction of increasing pitch, such as might be triggered by closure of the contacts 34m–35m. Similarly, should the temperature $t$ of the gas exiting from the turbine, as measured by the thermocouples 33 exceed the value T preset on the potentiometer 31, the resulting tripping in of relays B and D cuts out, through opening of the contacts 34am–35am, the high pitch circuit, in the event of the latter having been closed by closure of the contacts 34m–35m as the result of turbine overspeeding provoked by a pitch reduction due to tripping in of the relay B. Priority is in fact always given to pitch reduction, regardless of whether it has been manually or automatically commanded, such a pitch reduction command causing tripping in of relays B and D in the automatic control mode or of relay D in the manual control mode, and, hence, opening of contacts 34am–35am.

A set of contacts 136–138 is connected in series with the contacts 90–91 of relay A, the purpose of this relay being to cut off automatic or manual energizing of the high pitch field winding 60 supplied by the multivibrator 85 when the true temperature $t$ on exit from the turbine is equal to the selected maximum temperature T. As long as both these sets of contacts remain closed, the coil 72 of the high pitch contactor 58 can be energized, either for manual control, off the contact 50 of pitch control lever 6 and via the contacts 90–91 and 136–138 and the feathering microswitch 44, or for autmatic control only permissible by the closure of the automatic powering button 73 with the contact 100–102 closed, directly off the line 53 and via the reversing switch 67 and the contacts 100–102, 90–91 and 136–138. If either of the contacts 90–91 or 136–138 opens, the high pitch feeder circuit is broken and the pitch can be increased no further, this breaking of the circuit being caused by whichever of these two contacts opens first.

A contact 136–139 is connected in parallel with the contact 94–96 and causes, whether the automatic powering button 73 is closed or not automatic reduction of the pitch when it is closed, namely when $Q_{actual}$ tends to exceed $Q_{max}$, the circuit involved being: common line 53, reversing switch 67, line 70, pitch microswitch G43, closed contact 136–139, reverse microswitch 41, winding 74 and earth. This action is analogous to that of contact 94–96, when the true temperature $t$ of the gas on exit from the turbine exceeds the maximum permissible temperature T.

A contact 137–140 is connected in parallel across the line 70 and the contact 50 of pitch control lever 6 and, when closed, namely when $Q_{actual}$ attains $Q_{min}$, causes automatic increasing of the pitch until it opens once more, whether the automatic powering button 73 is closed or not. The contact 154–155, which remains open as long as the propeller is exerting forward thrust, is also connected in parallel across the line 70 and the contact 50; when closed, it causes, in analogous fashion to the contact 137–140, automatic increasing of the pitch until the propeller is exerting forward thrust once more. Similarly, the contact 34m–35m, which remains open so long as the isodrome regulator is fulfilling its regulating function, is also connected in parallel across the line 70 and the contact 50, in a circuit incorporating, in series, the contact 34am–35am giving priority to commanded pitch reductions and the contact 51am prohibiting automatic pitch increases during the engine starting phase. When it closes, the contact 34m–35m causes, in analogous fashion to the contacts 137–140 and 154–155, automatic increasing of the pitch until functioning of the isodrome regulator is restored, unless a pitch reduction is commanded, whether the automatic powering button 73 is closed or not.

If one of contacts 137–140, 154–155 or 34m–35m closes and no pitch reduction is commanded via the latter, then whichever of these three contacts closes first will cause a pitch increase via the circuit: common line 53; reversing switch 67; line 70; closed contact 137–140, 154–155 or 34m–35m; closed feathering microswitch 44; winding 72; earth. The motor 4 is driven in the direction of increasing pitch by closure of the circuit: common line 53, closed relay 58, high pitch winding 60 and earth.

The contacts 136 through 140 are arranged on either side of the beam-lever 131 (FIG. 2), in such a way that as long as the $Q_{actual}$ rate of flow is comprised between $Q_{min}$ and $Q_{max}$, the contact 136–138 remains closed and the contact 137–140 open, thereby permitting automatic or manual control over pitch increase or only manual reduction thereof. If the $Q_{actual}$ rate of flow reaches $Q_{max}$, the contact 136–138 opens, thereby breaking the automatic pitch increase circuit slightly before the $Q_{max}$ value is reached, while at the same time leaving the pilot with the faculty of further increasing the pitch manually, and when the $Q_{actual}$ and $Q_{max}$ values become equal, the contact 136–139 is established and provokes automatic pitch reduction until the contact 136–138 is re-established and the automaticity function tripped out if it was in service.

Onto the aforementioned functions of the temperature regulator box are superimposed the commands formulated by the devices used to compare the actual and theoretical rates of flow, to measure for the propeller the difference $\Delta p = (p_h - p_{hl})$ and to prevent overspeeding, in such a way as to ensure full safety for the turbine and the aircraft under the following conditions:

(1) If the temperature T set by the potentiometer 31 is reached before the $Q_{actual}$ rate of flow is equal to $Q_{max}$ it shall be impossible to increase the blade pitch in order to reach $Q_{max}$ and, conversely, if the $Q_{actual}$ rate of flow reaches $Q_{max}$ and the resulting gas temperature on exit from the turbine is less than this temperature T set on the potentiometer 31 of regulator box 30, manual or automatic increasing of the pitch shall likewise be prevented.

(2) If the propeller reaches the zero-thrust blade pitch angle, with $\Delta P$ equal to zero, or if the tachometric regulator is no longer fulfilling its regulating function, then, provided no pitch reduction is commanded before the $Q_{min}$ rate of flow is reached, the blade pitch is made to increase automatically until the propeller is exerting slight forward thrust once more or the servo-controlled metering device has become operative again; conversely, if the $Q_{actual}$ rate of flow reaches the $Q_{min}$ value before the propeller has reached the zero-thrust blade setting or if the tachometric regulator is no longer fulfilling its regulating function, the device comparing the rates of flow commands automatic pitch coarsening to make the $Q_{actual}$ rate of flow greater than the $Q_{min}$ flow.

(3) Automatic reduction of the propeller blade pitch in the event of the set temperature T or the $Q_{max}$ rate of flow being exceeded slightly is made possible only if the blade pitch is higher than the preset value G, 12 centesimal degrees say, this automatic pitch reduction being prevented from causing the blade pitch to fall below the aforementioned preset value, but the pilot being nevertheless allowed the faculty of commanding a lower pitch manually.

This amounts to (a) Automatic or manual pitch increasing being arrested by whichever of the parameters T or $Q_{max}$ is reached first;

(b) Automatic pitch reduction alone being arrested by whichever of the parameters propeller $\Delta P$, $Q_{min}$, metering device against closed limit stop (provided no pitch reduction is commanded), or blade pitch G arises first; if one of the first three of these parameters is reached, it will cause an automatic increase of the blade pitch until the propeller is exerting forward thrust once more, until the $Q_{actual}$ rate of flow has become higher than $Q_{min}$ again, or until the servo-controlled metering device has become operative once more, depending on which parameter is involved, the blade pitch limit G only preventing automatic pitch reduction below that limit.

The comparison, in percentage form, between the $Q_{actual}$ rate of flow and the $Q_{max}$ and $Q_{min}$ theoretical rates of flow can be visualized by means of the device shown in FIG. 4.

Referring now to that figure, the device for visualizing the comparison between the $Q_{max}$, $Q_{actual}$ and $Q_{min}$ rates of flow consists of a dial 161 on which reference marks 162 and 163, the angular spacing between which is definitely adjusted beforehand, can be positioned over the dial by means of a set screw 164. A deformable diaphragm 165, having a spring 166 and a set screw 167, is housed in an enclosure 168 into which the fuel pressures $p_{1c}$ and $p_{2c}$ upstream and downstream of the metering device 113 are led via passageways 115a and 116a tapped off the passageways 115 and 116 which themselves branch off the conduit 9 upstream and downstream respectively of the metering device 113. The deformations of the diaphragm 165 in response to the fuel pressures $p_{1c}$ and $p_{2c}$ are transmitted by a rod 169 to the slider 170 of a potentiometer 171 provided with an adjustable resistor 172. The differences in potential measured by potentiometer 171, which are proportional to the deformations of diaphragm 165 and therefore to variations in $$\Delta p_c = (p_{1c} - p_{2c})$$

are transmitted to a galvanometer which causes rotation of a pointer 173 on the percent-graduated dial 161, between the reference marks 162 and 163. This rotation of the pointer will be proportional at all times to the value of $\Delta p_c$ and therefore to the variations of $Q_{actual}$.

Since the final setting for the reference marks 162 and 163 is made on the ground, with due account for the value of $(P_2-P_1)$ and for the theoretical maximum and minimum rates of flow corresponding to it, the position of the pointer 173 between the marks 162 and 163 gives the pilot an indication of the value of the $Q_{actual}$ rate of flow into the turbine expressed as a percentage of the $Q_{max}$ and $Q_{min}$ values.

Alternatively, the beam lever 131 can be used to directly control travel of the slider 170a of a potentiometer 171 (FIG. 5) fulfilling the function of the potentiometer 171 in FIG. 4.

FIG. 10 shows a second embodiment of the mechanical portion of an overall control system according to the invention, in which a direct comparison is made between, on the one hand, the $Q_{actual}$ rate of flow determined by the position of the metering device 17 of tachometric regulator 18 when the difference between the fuel pressures $p_{1c}$ and $p_{2c}$ upstream and downstream of metering device 17 is maintained constant by a capsule 174 which is connected to the conduit 9 via lines 175 and 176 and which controls the position of a second metering device 177 and, on the other hand, the $Q_{max}$ rate of flow determined by the device 110a to which are communicated the air pressures $P_1$ and $P_2$ via the passageways 111a and 112a. A mechanical coupling 178 between metering device 17 and the device 110a enables appropriate commands to be transmitted via the conductive cluster 179 to the circuits 30a which couple the temperature regulator box 30 and the pitch control lever 6, functional descriptions of both of which have been given precedingly, to the pitch varying system actuator motor 4. Insofar as the turbopropeller, the propeller 3 and its motor 4, the pitch control lever 6, the fuel pump 7, the fuel cock 10, the tachometric regulator 18 and the hydraulic propeller feathering device 158 are concerned, the installation layout is the same as that described with reference to FIG. 1, while the device designed to provide a visual display of propeller thrust conditions is as described with reference to FIG. 6.

As stated precedingly, the systems used to compare the rates of flow consist of a capsule 174 and a device 110a both of which are illustrated on FIG. 11.

The capsule 174 encloses a deformable diaphragm 180 having a spring 181 and a set screw 182, and the two faces of this capsule are caused to be subjected, via lines 175 and 176, to the fuel pressures $p_{1c}$ and $p_{2c}$ prevailing upstream and downstream respectively of the metering device 17 of the tachometric regulator 18. When the diaphragm is in the steady state under the action of the pressures exerted on its two faces, the difference $(p_{1c}-p_{2c})$ is equal to a preset value corresponding to the theoretical maximum rate of fuel flow to which corresponds the strength of the spring 181. The metering device 177 is connected to the diaphragm 180 and inserted into the conduit 9 where it positions itself for the difference $(p_{1c}-p_{2c})$ to be equal to the value set by the strength of the spring 181. This being so, the rate of fuel flow through the section $Sd$, as determined by the position of the metering device 17, will be directly proportional to the area of that section, as shown in FIG. 12a, in which the $Q_{actual}$ rate of flow is plotted against the section $Sd$ offered by the metering device 17 for $(p_{1c}-p_{2c})$ = constant. A rod 183, sliding in a guideway 184 and coupled to the metering device 17, moves proportionally with variation of the section $Sd$ and hence with the $Q_{actual}$ rate of flow through that section.

The device 110a consists of a capsule 118a having a spring 119a and a set screw 120a, and the air pressure $P_1$ is led into this capsule via the passageway 111a. The said capsule 118a is enclosed in a chamber 121a into which the air pressure $P_2$ is led through a passageway 112a. A rod 122a having a trunnion 185 thereon is fixed to the end of the diaphragm 118a. As shown in FIGS. 12b and 12c, which respectively show, plotted against the parameter $(P_2-P_1)$, the section area required in the conduit 9 to ensure $Q_{max}$ with $(p_{1c}-p_{2c})$ = constant and the theoretical $Q_{max}$ rate of flow, displacements of the trunnion 185 due to variations of the parameter $(P_2-P_1)$ are proportional to $Q_{max}$ and therefore to the section $S$ to be offered to the fuel by the conduit 9 to ensure $(p_{1c}-p_{2c})$ = constant. The coupling rod 178 has an eye 186 at one end, into which engages the trunnion 185, and a yoke 187 at its other end, in which slides a pin 188 mounted on the rod 183. This pin 188 positions one end of the coupling 178 according to the value of $Q_{actual}$, while the trunnion 185 positions its other end according to the value of $Q_{max}$. Thus, by the process of the coupling 178, this device enables $Q_{actual}$ to be compared with $Q_{max}$. Travelling contacts 136a and 137a are placed one on each side of the coupling 178 at distances from the trunnion 185 bearing the ratio $Q_{min}/Q_{max}$. Like the device described with reference to FIG. 2, the travelling contact arm 136a is flanked by two fixed contact points 138a and 139a, and a fixed contact point 140a is positioned beside the contact 137a. These various contacts, namely 136a through 140a, fulfill functions identical to those of the contacts 136 through 140 in the device described with reference to FIG. 2, and are integrated into the electrical wiring diagram of FIG. 9 in lieu of said contacts 136 through 140.

As shown in FIG. 13, the device for visualizing the comparison between the $Q_{max}$, $Q_{actual}$ and $Q_{min}$ rates of flow in the overall control system of FIGS. 10 and 11 consist of a potentiometer 189 having an adjustable resistor 190, displacement of the slider 191 of said potentiometer being controlled by the rod 122a of the device 110a. The voltage $U_e$, which is determined by the position of the slider 191 and is proportional to the value of $Q_{max}$, causes displacement, through the medium of a galvanometer, of a pointer 192 over the dial, graduated in litres/hour, of an indicator instrument 193. The pointer 192 indicates the $Q_{max}$ rate of flow corresponding to the value of $(P_2-P_1)$. A voltage divider, which is connected in parallel to the line 194 connecting the potentiometer 189 to the instrument 193 and which consists of two resistors 195 and 196 the values of which are respectively $R_1$ and $R_2$, feeds into a second galvanometer in the instrument 193 a voltage $$U_s = U_e \frac{R_1}{R_1 + R_2}$$

such that $$\frac{U_e}{U_s} = \frac{Q_{max}}{Q_{min}}$$

thereby also indicating $Q_{min}$ rate of flow on the dial by means of a pointer 197.

Displacements of the rod 183 coupled to the metering device 17 of tachometric regulator 18 in turn cause displacements of the slider 198 of the potentiometer 199 provided with and adjustable resistor 200. The voltage determined by the position of slider 198 on potentiometer 199, which is proportional to the section $Sd$ and hence to the $Q_{actual}$ rate of flow into the turbine, is received by a third galvanometer, which is mounted in the indicator instrument 193 and which causes displacement over the instrument dial of a pointer 201 which indicates the $Q_{actual}$ rate of flow in litres per hour and enables it to be compared with the $Q_{max}$ and $Q_{min}$ values indicated by the pointers 192 and 197 respectively. The instrument 193 may be supplemented by an integrating counter 202 to indicate the total quantity of fuel consumed from the time the turbine was started, thereby informing the pilot of the quantity of fuel remaining in the tanks.

The overall systems described with reference to FIGS. 10 through 13, taken in conjunction with the mechanisms shown in FIGS. 6, 7 and 8 and the temperature regulating box 30, as schematically illustrated in FIG. 9 constitute the system executed in accordance with a second embodiment of the invention.

FIG. 14 shows a third embodiment of the mechanical portion of an overall control system according to the invention, in which use is made of an apparatus 203 to measure the fuel pressure differential $\Delta p_c = (p_{1c} - p_{2c})$ across a rigorously determined constriction 204 of fixed cross-section inserted into the conduit 9 downstream of the metering device 17 of the tachometric regulator 18. The $Q_{actual}$ rate of flow through the constriction 204 is a function of $\Delta p_c$, so that one may write $Q_{actual} = S\alpha\sqrt{\Delta p_c}$, where $S$ is the section of the constriction and $\alpha$ a coefficient, or, for a constant section $Q_{actual} = f\sqrt{\Delta p_c}$. A device 110b, to which the air pressures are transmitted via passageways 111b and 112b, determines the $Q_{max}$ value in terms of the parameter $(P_2 - P_1)$. A connection 205 joining the apparatus 203 to the device 110b permits comparison between the $Q_{max}$ and $Q_{actual}$ values and transmission via an electrically conductive cluster 206 of the necessary commands to the circuits 30a which respectively couple the temperature regulating box 30 described with reference to FIG. 9 and the pitch control lever 6 to the actuating motor 4 of the pitch varying system.

As in the case of the second embodiment, the remainder of the installation layout is as described with reference to FIG. 1.

FIG. 15 shows the assembly comprising the apparatus 203, the device 110b and the connection 205, together with the electric contacts operated by the latter.

The apparatus 203, which is designed to compare the fuel pressures $p_{1c}$ and $p_{2c}$ upstream and downstream respectively of the constriction 204, consists of two opposed capsules 207 and 208 the ends of which are connected together by a rod 209 bearing a trunnion 210 midway along its length. To these capsules are communicated, via the passageways 211 and 212, the pressures $p_{1c}$ and $p_{2c}$. Capsule 208 comprises a highly sensitive adjustment device consisting of a connecting rod 213 having a roller 214, a spring 215 and a set screw 216, and a beam lever 217 associated to a set screw 218. Displacements of the trunnion 210 in response to variations in $(p_{1c} - p_{2c})$ are proportional to $\Delta p_c$ and hence to $(Q_{actual})^2$, as shown in FIG. 16a.

The device 110b consists of a capsule 118b, associated to a spring 119b and a set screw 120b, which is enclosed in a chamber 121b and subjected, via the passageways 111b and 112b, to the air pressures $P_1$ and $P_2$. The rod 122b connected to the end of capsule 118b moves linearly in terms of the value $(P_2 - P_1)$, namely in terms of $Q_{max}$, as shown in FIG. 16b. The end of rod 122b carries a rack 219 meshing with a pinion 220 mounted on the same shaft as a cam 221. As shown in FIG. 16c, the angular displacements $\beta$ of pinion 220 and cam 221 are proportional to $(P_2 - P_1)$ and hence to $Q_{max}$. FIG. 16d shows the radius of the cam 221 plotted against $(P_2 - P_1)$.

The connection 205 conissts of a pivotable rod 222 provided with an eye 223 to surround the trunnion 210. Said rod carries at one end thereof a cam follower 224 maintained in pressure contact against cam 221 by a spring 225. The radius of cam 221 and rack 219 are so determined that the rod 222 is in equilibrium for a preset value of $(p_{1c} - p_{2c})$ which corresponds to the theoretical maximum rate of fuel flow. The travelling contacts 136b and 137b and the fixed contacts 138b, 139b and 140b, which fulfill identical functions to those of contacts 136 through 140 of the device described with reference to FIG. 2, are integrated into the electrical wiring diagram of FIG. 9 in lieu of those contacts. Said contacts are placed on each side of the pivotable rod 222 at distances from the trunnion 210 bearing the ratio $Q_{min}/Q_{max}$. The displacements of the connection 205 provide the required comparisons between the rates of flow.

The device for visualizing the comparison between the values of the $Q_{actual}$, $Q_{max}$ and $Q_{min}$ rates of flow in the overall control system shown in FIGS. 14 and 15 is illustrated in FIG. 17. A slider 226 actuated by the rod 122b travels over the potentiometer 227 associated to an adjustment resistor 228. The differences in potential measured by this potentiometer, which are proportional to $(P_2 - P_1)$ and hence to $Q_{max}$, are applied to a first galvanometer of an indicator instrument 193a and cause displacements of a pointer 192a which are proportional to $Q_{max}$. A voltage divider, similar to the one used in the visualizing device in FIG. 13 and comprising two resistors 195a and 196a, enables the $Q_{min}$ rate of flow to be shown on the dial of instrument 193a by means of a second galvanometer and a pointer 197a. A slider 229 fixed to the trunnion 210 of rod 209 is translated along a potentiometer 230 associated to an adjusting resistor 231 which is wound to reproduce the law $Q_{actual} = f\sqrt{\Delta p_c}$. The differences in potential measured by this potentiometer 230 are applied to a third galvanometer of the instrument 193a on which a pointer 201a indicates the value of $Q_{actual}$. As described with reference to FIG. 13, the indicator instrument 193a may be supplemented by an integrating counter 202a.

The overall systems described with reference to FIGS. 14 through 17, taken in conjunction with the mechanisms shown in FIGS. 6, 7 and 8 and with the temperature regulating box 30, as schematically illustrated in FIG. 9, constitute the system executed in accordance with a third embodiment of the present invention.

FIG. 18 shows a fourth embodiment of the mechanical portion of an overall control system according to the invention, in which the rates of flow are compared by two devices 232 and 233, the remainder of the installation layout being as described with reference to FIG. 1. The device 233 is connected via the electrically conductive cluster 236 to the coupling circuits 30a.

The device 232, which reproduces the law of variation of the $Q_{max}$ rate of flow in terms of the parameter $(P_2 - P_1)$ has communicated to it the air pressures $P_1$ and $P_2$, through the passageways 11c and 112c, and the fuel pressures $p_{1c}$ and $p_{2c}$ upstream and downstream respectively of the pump 7, through the passageways 234 and 235.

The device 233 compares the $Q_{max}$ rate of flow, the law governing which is reproduced by the device 222, with the $Q_{actual}$ rate of flow. To this end it has communicated to it, on the one hand, through passageways 236 and 237, the fuel pressures $p'_{1c}$ and $p_{1c}$ upstream and downstream of a constriction of known section contained in the device 232 and, on the other hand, through passageways 238 and 239, the fuel pressures $p_{3c}$ and $p_{4c}$ upstream and downstream of a constriction 240 of known section located ahead of the injection system into the turbine 2.

As shown in FIG. 19, the device 232 consists of a capsule 118c, associated to a spring 119c and a set screw 120c, into which the air pressure $P_1$ is communicated through a passageway 111c. The said capsule 118c is enclosed in a chamber 121c into which the air pressure $P_2$ is led through a passageway 112c. A rod 122c fixed to the end of capsule 118c carries on its end a metering device 113c inserted into the passageway 235. The displacements of metering device 113c are proportional to the values of $(P_2-P_1)$. The section S of passageway 235 is determined by the position of the metering device, and the rate of flow therethrough is proportional to its area, subject to the $\Delta p_c$ across said metering device being maintained constant. With a view to achieving this result, a deformable diaphragm 241, associated to a spring 242 and a set screw 243, has communicated to one of its faces, via a passageway 244, the pressure $p_{2c}$ upstream of metering device 113c and, to its other face, via a passageway 245, the pressure $p'_{1c}$ downstream thereof. The deformations sustained by the diaphragm 241 govern the positioning in passageway 235 of a metering device 246 which maintains constant the $\Delta p_c$ across metering device 113c, the position of which consequently determines the $Q_{max}$ rate of flow in terms of $(P_2-P_1)$. To measure this $Q_{max}$ rate of flow, it is enough to compare the pressure differentials across a constriction 247, as described hereunder.

As shown in FIG. 20, the comparator 233, which is designed to compare the fuel pressure differential across the constriction 247, namely the $Q_{max}$ rate of flow, with the pressure differential across the constriction 240 which is inserted into the conduit 9 just ahead of the injection system into the turbine 2 and which determines the $Q_{actual}$ rate of flow, consists of four capsules 248, 249, 250 and 251 mounted in opposed pairs.

Of the capsules 248 and 249, the former is subjected via a passageway 236 to the pressure $p'_{1c}$ prevailing upstream of the constriction 247, and the latter, via passageway 237, to the pressure $p_{1c}$ prevailing downstream of said constriction. The capsule 249 is associated to a spring 252 and a set screw 253. A rod 254 carrying a trunnion 255 midway along its length connects together the ends of capsules 248 and 249. The displacements of the trunnion 255 are proportional to the variations in $\Delta p_c = p'_{1c} - p_{1c}$ and are therefore functions of $Q_{max}$.

Of the capsules 250 and 251, the former is subjected, via the passageway 238, to the pressure $p_{3c}$ prevailing upstream of the constriction 240, and the latter, via the passageway 239, to the pressure $p_{4c}$ prevailing ahead of the fuel injection system. The capsule 251 is associated to a spring 256 and a set screw 257. A rod 258 which connects together the ends of capsules 250 and 251 carries a pointer 259 midway along its length. The translations of pointer 259 are proportional to the variations in $$\Delta p_c = (p_{3c} - p_{4c})$$

and are therefore functions of $Q_{actual}$.

A beam lever 260, which is hinged both at a fixed point 261 and onto the trunnion 255, carries two contact supports 262 and 263 fixed to it at points 264 and 265 the distances of which from the hinge point 261 are in the ratio $Q_{min}/Q_{max}$. Rods 266 and 267 sliding in guides 268 and 269 permit displacement of contact supports 262 and 263 parallel to the rod 254. The pointer 259 and the beam lever 260 are in equilibrium for preset values of $(p'_{1c}-p_{1c})$ and $(p_{3c}-p_{4c})$ which correspond to the theoretical maximum rate of fuel flow.

A travelling contact 136c mounted on the support 263 is flanked by two fixed contacts 138c and 139c, a travelling contact 137c mounted on the support 262 being similarly flanked by a fixed contact 140c and a resting contact. The said travelling contacts are actuated by the pointer 259 in accordance with the respective values of $Q_{max}$, $Q_{actual}$ and $Q_{min}$. The aforementioned contacts fulfil the same functions as the contacts 136 through 140 of the device described with reference to FIG. 2 and are integrated in lieu thereof in the electrical wiring diagram of FIG. 9.

FIG. 21 shows the device for providing visualization of the rates of flow in the overall control system of FIG. 18. The fuel pressures $p'_{1c}$ and $p_{1c}$ upstream and downstream of the constriction 247 are communicated, by passageways 236a and 237a tapped off the passageways 236 and 237 respectively, to either side of a deformable diaphragm 270 associated to a spring 271 and set screw 272 and enclosed in a capsule 273. A rod 274 connected to the diaphragm 270 actuates the slider 275 of a potentiometer 276 associated to an adjustment resistor 277. The difference in potential measured is applied to one of the galvanometers in an indicator instrument 193b which controls the displacements of a pointer 192b, which in turn provides a reading of the $Q_{max}$ rate of flow. A voltage divider similar to those described with reference to FIGS. 13 and 17 and consisting of two resistors 195b and 196b applies a voltage $U_s$ to a second galvanometer of instrument 193b such that $$\frac{U_e}{U_s} = \frac{Q_{max}}{Q_{min}}$$

where $U_e$ is the voltage measured on the potentiometer 276. This second galvanometer controls a pointer 197b which gives a reading of the $Q_{min}$ rate of flow.

Similarly, the pressures $p_{3c}$ and $p_{4c}$ upstream and downstream of the constriction 240 are communicated to either side of a deformable diaphragm 278 associated to a spring 279 and set screw 280 and enclosed in a capsule 281, via passageways 238a and 239a tapped off the passageways 238 and 239 respectively. A rod 282 connected to the diaphragm 278 actuates the slider 283 of a potentiometer 284 associated to an adjustment resistor 285. The differences in potential measured are applied to a third galvanometer in the instrument 193b, and this galvanometer controls a pointer 201b which gives a reading of the $Q_{actual}$ rate of flow. As in the case of the devices described precedingly, the indicator instrument 193b may be supplemented by an intergrating counter 202b.

The systems described with reference to FIGS. 18 through 21, taken in conjunction with the mechanisms shown in FIGS. 6, 7 and 8 and with the temperature regulating box 30, as schematically illustrated in FIG. 9, constitute the overall control system executed in accordance with a fourth embodiment of the present invention.

It is to be clearly understood that modifications suggested by the art or by practical considerations may be made to the various embodiments described hereinbefore without departing from the scope of the invention as defined in the appended claims. For instance, whereas the drawings illustrate the case of a turbopropeller equipped with an electrically-controlled variable pitch propeller, control of the propeller pitch varying system may in fact be provided by any other mechanical, hydraulic or pneumatic means, or by any combination thereof. In the case of a propeller with an oleo-pneumatically controlled variable pitch system, the ancillary devices used in the layout described in the aforementioned U.S. patent application Ser. No. 1,600 filed by the applicant on January 11, 1960 may be used.

Furthermore, in lieu of its application to the control of a turbopropeller, the control system according to the present invention may be applied to the control of a gas turbine drivably connected to a helicopter rotor, with suppression of the automatic maximum powering button and circuits as well as of the safety device to prevent engine overspeeding. Such pitch variations as are obtained then become relevant to the collective pitch of the rotor, the cyclic pitch control remaining independent of the gas turbine control. In this instance, a normally-open hand-operated switch incorporating automatic return action is provided in order to bridge the maximum pitch microswitch where necessary.

The control system may likewise comprise a thermal safety regulator and a turbine automatic powering device of the types described in the aforementioned U.S. patent application Ser. No. 1,600.

What I claim is:

1. A control method for the powerplant of an aerodyne having a gas turbine and an aerodynamic propelling device driven thereby and equipped with blades the pitch of which may be varied, which consists in adjusting the quantity of fuel delivered to the turbine in order to maintain constant the working rotation speed thereof, independently controlling manually the blade pitch of the propelling device between the maximum and minimum permissible pitches, continuously comparing the actual turbine temperature with an upper limit corresponding to the maximum permissible temperature for said turbine, continuously comparing the actual rate of flow for the fuel delivered to said turbine with upper and lower limits respectively corresponding to the theoretical maximum and minimum rates of fuel flow for said turbine and, independently from any manual controlling action, automatically reducing the blade pitch as soon and as long as the first one of the actual turbine temperature and of the actual rate of fuel flow tends to exceed its upper limit, automatically increasing the blade pitch as soon as the first one of the difference between the actual rate of fuel flow and its lower limit and of the fuel feeding in flight for the turbine tends to a zero value and rendering such a blade pitch increasing, for a fuel feeding in flight tending to zero, inoperative in the case of a manually controlled pitch decreasing.

2. A control method, according to claim 1, wherein the variations in the actual rate of fuel flow with respect to the maximum theoretical rate of fuel flow are determined as a function of the variations, with respect to a determined value corresponding to said maximum theoretical rate of fuel flow, in the fuel pressure differential across a variable constriction located in the line for feeding the turbine with fuel upstream of the adjustment of the quantity of fuel delivered to the turbine and having a passageway section which is a function of the difference between the total air heads on entry into and on exit from the gas turbine compressor.

3. A control method, according to claim 1, wherein the maximum theoretical rate of fuel flow to the turbine is determined in terms of the difference between the total heads on entry into and on exit from the gas turbine compressor, the actual rate of fuel flow being determined in terms of the difference between the fuel pressures respectively upstream and downstream of a fixed constriction in the fuel supply line to the turbine.

4. A control method, according to claim 1, wherein the maximum theoretical rate of fuel flow to the turbine is determined in terms of the difference between the total heads on entry into and on exit from the gas turbine compressor, the actual rate of fuel flow being determined in terms of the passageway section through a variable constriction in the fuel supply line to the turbine, in respect of which the said difference between the fuel pressures is maintained constant.

5. A control method, according to claim 1, wherein the comparison between the actual and the maximum theoretical rates of fuel flow is effected in terms of the fuel pressure differentials across two calibrated orifices, of which one is inserted in the fuel supply line to the turbine downstream of the adjustment of the quantity of fuel delivered to the turbine, the other in a circuit for determining the maximum theoretical rate of flow in terms of the difference between the total heads respectively on entry into and on exit from the gas turbine compressor.

6. A control method according to claim 1, further consisting in modifying the rate of fuel flow for any manually controlled increasing and decreasing of the pitch in order to immediately set up the turbine working speed at a value slightly greater and smaller than that corresponding to the desired pitch variation, respectively.

7. A control system for the powerplant of an aerodyne having a gas turbine and an aerodynamic propelling device driven thereby and equipped with blades the pitch of which may be varied, comprising means for adjusting the quantity of fuel delivered to the turbine in order to maintain constant the working rotation speed thereof, means for independently controlling manually the blade pitch of the propelling device between the maximum and minimum permissible pitches, means for continuously comparing the actual turbine temperature with an upper limit corresponding to the maximum permissible temperature for said turbine, means for continuously comparing the actual rate of flow for the fuel delivered to said turbine with upper and lower limits respectively corresponding to the theoretical maximum and minimum rates of fuel flow for said turbine and, independently from any manual controlling action, means for automatically reducing the blade pitch as soon and as long as the first one of the actual turbine temperature and of the actual rate of fuel flow tends to exceed its upper limit, means for automatically increasing the blade pitch as soon as the first one of the difference between the actual rate of fuel flow and its lower limit and of the fuel feeding in flight for the turbine tends to a zero value, and means for rendering such blade pitch increasing means, when the fuel feeding in flight tends to a zero value, inoperative in the case of a manually controlled pitch decreasing.

8. A control system according to claim 7, further comprising means for modifying the rate of fuel flow for any manually controlled increasing and decreasing of the pitch in order to immediately set up the turbine working speed at a value slightly greater and smaller than that corresponding to the desired pitch variation, respectively.

9. A control system according to claim 7, further comprising means for indicating the actual pitch attained under the action of said manually pitch controlling, automatically reducing and increasing means, and means for indicating the values of the actual, theoretical maximum and theoretical minimum rates of fuel flow.

10. A control system for the powerplant of an aerodyne having a gas turbine and an aerodynamic propelling device driven thereby and equipped with blades the pitch of which may be varied, comprising, in combination, a main line for feeding the turbine with fuel, means connected to the turbine shaft and responsive to variation in the turbine speed, means in said main line connected to said speed responsive means and adapted to vary the rate at which fuel is supplied to said turbine in reverse relation to the speed variation to maintain said speed at a constant working value after starting, means in the turbine responsive to variation in the turbine temperature, means connected to said temperature responsive means for comparing the actual turbine temperature with an upper temperature limit corresponding to the maximum permissible temperature for the turbine, means connected to said main line for determining the maximum rate of fuel flow for said turbine, means connected to said determining means and to said main line for continuously comparing the actual rate of flow for the fuel delivered to said turbine through said main line with upper and lower limits respectively corresponding to the theoretical maximum and minimum rates of fuel flow for said turbine, means in said main line for detecting a zeroizing of the fuel feeding in flight, pitch varying means connected to the propelling device for adjusting the pitch of the blades thereof, means connected to said pitch varying means for manually controlling the blade pitch between its minimum and maximum permissible values, means connecting said pitch varying means with said temperature comparing means, rate of fuel flow comparing means and detecting means for, independently from any manual controlling action, on the one hand, automatically reducing the blade pitch down to a predetermined positive value as soon and as long as the first one of the actual turbine temperature and of the actual rate of fuel flow tends to exceed its upper limit, and, on the other hand, automatically increasing the blade pitch as soon as the first one of the difference between the actual rate of fuel flow and its lower limit and of the fuel feeding in flight for the turbine tends to a zero value, means for rendering said connecting means for such a blade pitch increasing, when the fuel feeding in flight tends to a zero value, inoperative in the case of a manually controlled pitch decreasing, means interconnecting the propelling device and said manual pitch controlling means for indicating by the position of said last means the actual pitch attained under the action of said manual pitch controlling means and of said automatically pitch reducing and increasing means, means for rendering ineffective said pitch varying means as soon as the minimum and maximum pitches are attained, means for indicating the values of the actual, theoretical maximum and theoretical minimum rates of fuel flow, and means automatically operative when the decreasing blade pitch attains said predetermined positive value for rendering said connecting means ineffective.

11. A control system for the powerplant of an aerodyne having a gas turbine and an aerodynamic propelling device driven thereby and equipped with blades the pitch of which may be varied, comprising, in combination, means responsive to changes in turbine speed for varying the rate at which fuel is supplied to said turbine, means responsive to the difference existing between the actual turbine temperature and an upper limit corresponding to the maximum permissible temperature for said turbine, means responsive to the differences existing between the actual rate of flow for the fuel delivered to the turbine and upper and lower limits respectively corresponding to the theoretical maximum and minimum rates of fuel flow for said turbine, means responsive to a zeroizing of the fuel feeding in flight, means controlled by said temperature rate of fuel flow and fuel feeding responsive means for, independently from any manual controlling action, on the one hand, reducing the blade pitch of the propelling device down to a predetermined positive value as soon and as long as the first one of the actual turbine temperature and of the actual rate of fuel flow tends to exceed its upper limit, and, on the other hand, automatically increasing the blade pitch as soon as the first one of the difference between the actual rate of fuel flow and its lower limit and of the fuel feeding in flight for the turbine tends to a zero value, and means for rendering said last means for a pitch increasing, when the fuel feeding in flight tends to a zero value, ineffective in the case of a manually controlled pitch decreasing.

12. A control system for the powerplant of an aerodyne having a gas turbine fed with air by a compressor and an aerodynamic propelling device driven thereby and equipped with variable pitch blades, comprising, in combination, a fuel pump, a main fuel line connected to said pump for feeding the turbine with fuel, means connected to the turbine shaft and responsive to changes in turbine speed, fuel regulating means having a fuel flow metering device inserted in said line and controlled by said speed responsive means for varying the rate at which fuel is supplied to said turbine so as to maintain a predetermined constant turbine working speed after starting, means in the turbine responsive to variation in the turbine temperature, means connected to said temperature responsive means for continuously comparing the actual turbine temperature with an upper limit corresponding to the maximum permissible temperature for the turbine, means for determining the maximum rate of fuel flow for said turbine having an adjustable capsule and two passageways respectively connecting the two sides of said capsule with the entry into and the exit from the gas turbine compressor, means connected to said determining means and to said main line for continuously comparing the actual rate of fuel flow for said turbine through said line with upper and lower limits respectively corresponding to the theoretrical maximum and minimum rates of fuel flow for said turbine, means connected to said main line for detecting a zeroizing of the fuel feeding in flight, electric motor means for varying the blade pitch of the propelling device, a first normally open electric circuit connected to said motor means for inducing when closed a movement of said motor means for decreasing said blade pitch, a second normally open electric circuit connected to said motor, means for inducing when closed a movement of said motor means for increasing said blade pitch, a main electric line for feeding said first and second circuits, first contact means controlled by said temperature and rate of fuel flow comparing means for maintaining the second circuit opened and for closing the first one as soon and as long as the first one of the actual turbine temperature and of the actual rate of fuel flow tends to exceed its upper limit for decreasing the blade pitch down to a positive predetermined value, second contact means controlled by said rate of fuel flow comparing and fuel feeding detecting means for maintaining the first circuit opened and for closing the second one as soon as the first one of the difference between the actual rate of fuel flow and its lower limit and of the fuel feeding for the turbine in flight tends to a zero value for increasing the blade pitch, means for manually controlling the blade pitch between its minimum and maximum permissible values, two auxiliary electric lines respectively connecting said pitch controlling means to said first circuit and to the first contact means, means interconnecting said motor means and said manual pitch controlling means for indicating by the position of said last means the actual pitch attained under the action of the closures of said first and second circuits, means for rendering inoperative said motor means as soon as the minimum and maximum pitches are attained, means for indicating the values of the actual and theoretical maximum and minimum rates of fuel flow, means for rendering inoperative said first contact means as soon as the decreasing blade pitch attains said predetermined positive value, means for suppressing the action of a fuel feeding tending to zero on said second contact means as long as a pitch decreasing is manually controlled, and means for modifying the rate of fuel flow for any controlled increasing and decreasing of the pitch in order to immediately set up the turbine working speed at a value slightly greater and smaller than that corresponding to the desired pitch variation, respectively.

13. A control system, according to claim 12, wherein the fuel regulating means comprises a pump delivering a liquid under pressure, a distributing slide-valve connected to said pump and one end of which is connected to the means responsive to changes in turbine speed, a servo-controlled piston mechanically connected to the fuel flow metering device and hydraulically connected to said slide-valve, a temporary follow-up acting piston hydraulically connected to said slide-valve and to said servo-controlled piston, an adjustable restricted valve interconnecting the two faces of said temporary follow-up acting piston, a throttle lever, a pinion controlled by said throttle lever, a rack in meshing engagement with said pinion and aligned with said slide-valve while facing said end thereof, and a spring interposed between said rack and said end of the slide-valve.

14. A control system, according to claim 13, wherein the means for detecting a zeroizing of the fuel feeding and for suppressing the action of a zero fuel feeding on the second contact means as long as a pitch decreasing is manually controlled comprise a device sensitive to the fluid pressure exerted on the face of the servo-controlled piston which is mechanically connected to the fuel flow metering device, a first normally open contact, a conductive plate connected to said device for closing said first contact when the fuel feeding in flight is zeroized, in order to prevent overspeeding, a second contact normally open during the starting period and a third normally closed contact which is open when the first normally open circuit is put under tension, said three contacts being connected in series while the three series-connected contacts are mounted in parallel between the main electric line and the auxiliary electric line connecting the pitch controlling means to the first contact means.

15. A control system, according to claim 13, wherein a shaft on which is slidably mounted the pinion is connected to the throttle lever and wherein the means for modifying the rate of fuel flow comprises two aligned pistons respectively connected to the parallel faces of said pinion, means normally closed interconnecting said pistons and the slide-valve, and means controlling said normally closed interconnecting means for opening said last means in order to displace one piston or the other according as an increasing or a decreasing of the pitch is controlled.

16. A control system, according to claim 15, wherein the normally closed interconnecting means and the means controlling said last means comprise two lines respectively connected to the pistons, two return passageways, a line connected to the slide-valve, a distributor normally obturating said three lines while allowing a slight communication of said first two lines with said return passageways, and two electromagnets adapted to displace said distributor in one direction or the other and respectively connected to the first and to the second normally open electric circuits.

17. A control system according to claim 12, wherein the means for comparing the actual and theoretical maximum rates of fuel flow comprises a device for measuring the actual rate of fuel flow, a pivotable transmission means controlled by said device and by the means for determining said theoretical maximum rate of fuel flow, and wherein the contact means comprises, a set of two successive contacts located in the displacement direction of said transmission means for an increasing rate of fuel flow, the first one of said contacts normally closed pertaining to the second contact means and being inserted in the second electric circuit while the second contact normally opened pertains to the first contact means and is inserted in the first electric circuit, and a single normally open contact, located in the displacement direction of said transmission means for a decreasing rate of fuel flow, pertaining to the second contact means and inserted in the second electric circuit, the distances of the two successive contacts and of the single contact from the pivotal axis of the transmission means being in the same ratio as the theoretical maximum and minimum rates of fuel flow.

18. A control system according to claim 17, wherein the means for continuously comparing the actual rate of fuel flow with said theoretical maximum rate of fuel flow comprise a variable constriction means inserted in the main line upstream of the fuel flow metering device, and means connected to the adjustable capsule, and means responsive to the difference between the fuel pressures in said main line respectively upstream and downstram of said variable constriction means and connected to the pivotable transmission means.

19. A control system, according to claim 18, wherein the means for indicating the values of the actual and theoretical maximum and minimum rates of fuel flow comprises an indicator instrument an adjustable dial for said instrument having two preset reference marks corresponding to the theoretical maximum and minimum rates of flow, respectively, a pointer displaceable with respect to said dial, a potentiometer obeying a linear law for controlling said pointer, and a transmission interconnecting the slider of said potentiometer and the capsule.

20. A control system, according to claim 18, wherein the variable constriction means comprises an auxiliary fuel flow metering device inserted in the main line, wherein the means responsive to the differential fuel pressure and the transmission system comprise two adjustable capsule devices respectively connected to said main line upstream and downstream of said auxiliary fuel metering device, and wherein the pivotable transmission means comprises a beam lever system connected to said capsule devices and in equilibrium for a preset value of said differential fuel pressure which corresponds to the theoretical maximum rate of fuel flow, the pivotal axis of said beam lever acting as the pivotal axis of the transmission means.

21. A control system, according to claim 20, wherein the means for indicating the values of the actual and theoretical maximum and minimum rates of fuel flow comprises an indicator instrument, an adjustable dial for said instrument having two preset reference marks corresponding to the theoretical maximum and minimum rates of fuel flow, respectively, a pointer displaceable with respect to said dial, a potentiometer obeying a linear law for controlling said pointer, and a transmission interconnecting the slider of said potentiometer and the lever beam.

22. A control system, according to claim 17, wherein the means for continuously comparing the actual rate of fuel flow with said theoretical maximum rate of fuel flow, a variable constriction means inserted in the main line downstream of the fuel flow metering device, an adjustable loaded diaphragm connected to said variable constriction means and responsive to the difference between the fuel pressures in said main line upstream and downstream of said fuel flow metering device, the pivotable transmission means interconnecting the adjustable capsule and said fuel flow metering device.

23. A control system, according to claim 22, wherein the variable constriction means comprises an auxiliary fuel flow metering device inserted in the main line, entry into and to the exit from the gas turbine compressor, two guided parallel rods respectively connected to said fuel flow metering device and to the adjustable capsule and a coupling rod articulated at its ends on said guided rods and in equilibrium for a preset value of the differential fuel pressure across the fuel flow metering device which corresponds to the theoretical maximum rate of fuel flow, the pivotal axis of the coupling rod on the guided rod connected to the capsule acting as the pivotal axis of the transmission means.

24. A control system, according to claim 23, wherein the means for indicating the values of the actual and theoretical maximum and minimum rates of fuel flow comprises an indicator instrument having a dial graduated in litres per hour, three pointers displaceable with respect to said dial for respectively reading thereon the values of the actual and theoretical maximum and minimum rates of fuel flow and an integrating counter, two potentiometers obeying a linear law for respectively controlling the pointers for the actual and theoretical maximum rates of fuel flow, two transmissions respectively interconnecting the sliders of said potentiometers and the guided parallel rods, and a voltage divider connected in parallel at the output of the potentiometer for the theoretical maximum rate of fuel flow and dividing the voltage determined by said potentiometer by $$\frac{Q_{max}}{Q_{min}}$$

for controlling the pointer for the theoretical minimum rate of flow.

25. A control system, according to claim 17, wherein the means for continuously comparing the actual rate of fuel flow with said theoretical maximum rate of fuel flow, comprise a fixed constriction inserted in the main line downstream of the fuel flow metering device, means responsive to the difference between the fuel pressures in said main line upstream and downstream of said fixed constriction, means for adjusting said last means, the transmission system interconnecting the adjustable capsule and said means responsive to the differential fuel pressure.

26. A control system, according to claim 25, wherein the means responsive to the differential fuel pressure and for adjusting said last means comprise two opposed capsules respectively connected to the main line upstream and downstream of the fixed constriction, an adjustable beam lever bearing on one of said capsules, a lever, a roller carried by said lever in contacting engagement with said beam lever, and an adjustable spring bearing on said lever, wherein the transmission means comprises a rack connected to the adjustable capsule, a pinion in meshing engagement with said rack the angular displacements of which are a linear function of the difference between the total air heads on entry into and on exit from the gas turbine compressor, a cam connected to said pinion and the radius of which is a function of the square of said differential total air head, a beam lever connected to said two opposed capsules, and in equilibrium for a preset value of the differential fuel pressure across the fixed constriction which corresponds to the theoretical maximum rate of fuel flow, a cam follower in contacting engagement with said cam, and a spring for applying said cam follower on said cam, the pivotal axis of the beam lever acting as the pivotal axis of the transmission means.

27. A control system, according to claim 26, wherein the means for indicating the values of the actual and theoretical maximum and minimum rates of fuel flow comprises an indicator instrument having a dial graduated in litres per hour, three pointers displaceable with respect to said dial for respectively reading thereon the values of the actual and theoretical maximum and minimum rates of fuel flow and an integrating counter, a first potentiometer which is wound so as to reproduce a law which is a function of the square root of the differential fuel pressure across the fixed constriction and having a slider displaceable in translation and fixed to the pivotal axis of the beam lever for controlling the dpointer for the actual rate of fuel flow, a second potentiometer obeying a linear law for controlling the pointer for the theoretical maximum rate of fuel flow and having a slider connected to the rack, and a voltage divider connected in parallel at the output of the potentiometer for the theoretical maximum rate of fuel flow and dividing the voltage determined by said potentiometer by $$\frac{Q_{max}}{Q_{min}}$$

for controlling the pointer for the theoretical minimum rate of flow.

28. A control system, according to claim 17, wherein the means for continuously comparing the actual rate of fuel flow with said theoretical maximum rate of fuel flow, comprise a first assembly connected to the upstream and downstream sides of the fuel pump having a fixed constriction and having the adjustable capsule to be sensitive to the difference between the total air heads on entry into and on exit from the gas turbine compressor, a second fixed constriction in the main line just ahead of the turbine injector system, a second assembly responsive to the differences between the fuel pressures upstream and downstream of said first constriction in said first assembly and upstream and downstream of said second constriction in said main line, the transmission means being connected to said second assembly.

29. A control system, according to claim 28, wherein the first and second assemblies comprise a first by-pass connecting the upstream and downstream sides of the fuel pump, in said by-pass, in succession from the upstream side of said pump, a first fixed constriction and two auxiliary fuel flow metering devices, the adjustable capsule connected to the first auxiliary fuel flow metering device, a second by-pass connecting the upstream and downstream sides of said first auxiliary fuel flow metering device, an adjustable loaded diaphragm in said second by-pass connected to the second auxiliary fuel flow metering device, a first pair of adjustable opposed capsules respectively connected to the upstream and downstream sides of the first fixed constriction, and a second pair of adjustable opposed capsules parallel to the capsules of the first pair and respectively connected to the upstream and downstream sides of the second fixed constriction.

30. A control system, according to claim 29, wherein the means for indicating the values of the actual and theoretical maximum and minimum rates of fuel flow comprises an indicator instrument having a dial graduated in litres per hour, three pointers displaceable with respect to said dial for respectively reading thereon the values of the actual and theoretical maximum and minimum rates of fuel flow and an integrating counter, a first loaded diaphragm connected to upstream and downstream sides of the first constriction, a second loaded diaphragm connected to the upstream and downstream sides of the second constriction, two potentiometers obeying a linear law for respectively controlling the pointers for the actual and theoretical maximum rates of fuel kow, two transmissions respectively interconnecting the sliders of said potentiometers and said two diaphragms, and a voltage divider connected in parallel at the output of the potentiometer for the theoretical maximum rate of fuel flow and dividing the voltage determined by said potentiometer by $$\frac{Q_{max}}{Q_{min}}$$

for controlling the pointer for the theoretical minimum rate of flow.

31. A control system, according to claim 29, wherein the transmission means comprise a beam lever controlled by the first pair of capsules, two slides pivotably mounted on said beam lever and respectively guided to travel parallel to the common axis of said two capsules in the directions towards which said beam lever is displaced for an increasing and for a decreasing rate of fuel flow, a connection between the capsules of the second pair, a pointer carried by said connection for travelling parallel to said common axis, the two successive contacts being carried by the corresponding slide, the single normally open contact being carried by the other slide, said pointer controlling said contacts and being in equilibrium as well as said beam lever for preset values of the differential fuel pressures across the first and second constrictions which correspond to the theoretical maximum rate of fuel flow, the slides carrying the successive and single contacts being placed on the beam lever at distances from its pivotal axis bearing the same ratio as the theoretical maximum and minimum rates of fuel flow.

32. A control method for the powerplant of an aircraft having a gas turbine and a variable pitch propeller driven thereby which consists in adjusting the quantity of fuel delivered to the turbine in order to maintain constant the working rotation speed thereof, independently controlling manually the pitch of the propeller between maximum reverse and feathering, continuously comparing the actual turbine temperature with an upper limit corresponding to the maximum permissible temperature for said turbine, continuously comparing the actual rate of flow for the fuel delivered to said turbine with upper and lower limits respectively corresponding to the theoretical maximum and minimum rates of fuel flow for said turbine and, independently from any manual controlling action, automatically reducing the blade pitch as soon and as long as the first one of the actual turbine temperature and of the actual rate of fuel flow tends to exceed its upper limit, automatically increasing the blade pitch as soon, on the one hand, as the actual turbine temperature and rate of fuel flow are less than their upper limits and, on the other hand, as the first one of the difference between the actual rate of fuel flow and its lower limit, of the propeller thrust and of the fuel feeding in flight for the turbine tends to a zero value and rendering such a blade pitch increasing, for a fuel feeding in flight tending to zero, inoperative in the case of a manually controlled pitch decreasing.

33. A control system for the powerplant of an aircraft having a gas turbine and a variable pitch propeller driven thereby, comprising, in combination, means for adjusting the quantity of fuel delivered to the turbine in order to maintain constant the working rotation speed thereof, means for independently controlling manually the pitch of the propeller between maximum reverse and feathering, means for continuously comparing the actual turbine temperature with an upper limit corresponding to the maximum permissible temperature for said turbine, means for continuously comparing the actual rate of flow for the fuel delivered to said turbine with upper and lower limits respectively corresponding to the theoretical maximum and minimum rates of fuel flow for said turbine, means for automatically reducing the blade pitch down to a predetermined value as soon and as long as the first one of the actual turbine temperature and of the actual rate of fuel flow tends to exceed its upper limit, means for continuously detecting the thrust of the propeller, means for automatically increasing the blade pitch as soon as the first one of the difference between the actual rate of fuel flow and its lower limit, of the propeller thrust and of the fuel feeding in flight for the turbine tends to a zero value, means for rendering such a blade pitch increasing means, for a fuel feeding in flight tending to zero, ineffective in the case of a manually controlled pitch decreasing, means for modifying the rate of fuel flow for any controlled increasing and decreasing of the pitch in order to immediately set up the turbine working speed at a value slightly greater and smaller than that corresponding to the desired pitch variation, respectively, means connected to said pitch controlling means and controlled by said temperature and rate of fuel flow comparing means for automatically increasing the blade pitch until maximum loading is attained for the turbine as long as the actual turbine temperature and rate of fuel flow are less than their upper limits while automically increasing the blade pitch, and means for indicating the actual pitch attained under the action of said pitch controlling, reducing and increasing means.

34. A control system for the powerplant of an aircraft having a gas turbine and a variable pitch propeller driven thereby, comprising, in combination, means for adjusting the quantity of fuel delivered to the turbine in order to maintain constant the working rotation speed thereof, means for varying the blade pitch of the propeller, means connected to said pitch varying means for independently controlling manually the pitch of the propeller between maximum reverse and feathering, means for continuously comparing the actual turbine temperature with an upper limit corresponding to the maximum permissible temperature for said turbine, means for continuously comparing the actual rate of flow for the fuel delivered to said turbine with upper and lower limits respectively corresponding to the theoretical maximum and minimum rates of fuel flow for said turbine, means for automatically reducing the blade pitch down to a predetermined value as soon and as long as the first one of the actual turbine temperature and of the actual rate of fuel flow tends to exceed its upper limit, means for continuously detecting the thrust of the propeller, a first means for automatically increasing the blade pitch as soon as the first one of the difference between the actual rate of fuel flow and its lower limit, of the propeller thrust, and of the fuel feeding in flight for the turbine tends to a zero value, means for rendering said first increasing means, for a fuel feeding in flight tending to zero, ineffective in the case of a manually controlled pitch decreasing, means for modifying the rate of fuel flow for any controlled increasing and decreasing of the pitch in order to immediately set up the turbine working speed at a value slightly greater and smaller than that corresponding to the desired pitch variation, respectively, a second means for automatically increasing the blade pitch connected to said pitch varying means controlled by said temperature and rate of fuel flow comparing means and operative until maximum loading is attained for the turbine as long as the actual turbine temperature and rate of fuel flow are less than their upper limits, means interconnecting said temperature and rate of fuel flow comparing means and said second pitch increasing means for rendering said last means ineffective as soon as the first one of the actual turbine temperature and of the rate of fuel flow is equal to its upper limit and for starting again said second pitch increasing means as the actual turbine temperature or rate of fuel flow decreases below its upper limit, means for rendering ineffective the means for automatically reducing the blade pitch and said first and second pitch automatic increasing means as soon as the decreasing pitch attains a predetermined positive value, means interconnecting the propeller and said manual pitch controlling means for indicating by the position of said last means the actual pitch attained under the action of said manual pitch controlling means and of said pitch varying, automatically reducing and first and second automatic increasing means, and means for rendering ineffective said pitch varying means as soon as the pitch attains the reverse value under the action of said manual pitch controlling means for decreasing the pitch from said predetermined positive value.

35. A control system for the powerplant of an aircraft having a gas turbine and a variable pitch propeller driven thereby, comprising, in combination, means responsive to changes in turbine speed for varying the rate at which fuel is supplied to said turbine, motor means for varying the blade pitch of the propeller, first means normally operable for effecting movement of said motor means for decreasing said blade pitch, second means normally operable for effecting movement of said motor means for increasing said blade pitch, means connected to said first and second normally operable means for manually controlling the pitch of the propeller between maximum reverse and feathering, means responsive to the difference existing between the actual turbine temperature and an upper limit coresponding to the maximum permissible temperature for said turbine, means responsive to the differences existing between the actual rate of flow for the fuel delivered to the turbine and upper and lower limits respectively corresponding to the theoretical maximum and minimum rates of fuel flow for said turbine, means responsive to a zeroizing of the fuel feeding in flight, means for continuously detecting the thrust of the propeller, means controlled by said temperature and rate of fuel flow responsive means for rendering said second normally operable means ineffective and for simultaneously rendering said first normally operable means automatically effective as soon and as long as the first one of the actual turbine temperature and of the actual rate of fuel flow tends to exceed its upper limit for automatically decreasing the blade pitch down to a positive predetermined value, means controlled by said rate of fuel flow responsive means, said fuel flow zeroizing responsive means and said propeller thrust detecting means for rendering said first normally operable means ineffective and for simultaneously rendering said second normally operable means effective as soon as the first one of the difference between the actual rate of fuel flow and its lower limit, of the propeller thrust, and of the fuel feeding in flight for the turbine tends to a zero value for automatically increasing the blade pitch, means controlled by said first normally operable means for rendering said second normally operable means, for a fuel feeding in flight tending to zero, ineffective in the case of a manualy controlled pitch decreasing, means connected to said second normally operable means and controlled by said temperature and rate of fuel flow responsive means for rendering said second normally operable means effective as long as the actual turbine temperature and rate of fuel flow are less than their upper limits for automatically increasing the blade pitch until maximum loading is attained for the turbine, means interconnecting said temperature and rate of fuel flow responsive means and said second normally operable means for starting again said second normally operable means as soon as the actual turbine temperature or rate of fuel flow decreases below its upper limit, and means for rendering ineffective the first and second normally operable means as soon as the decreasing pitch attains said predetermined positive value.

36. A control system for the powerplant of an aircraft having a gas turbine fed with air by a compressor and a variable pitch propeller driven thereby, comprising, in combination, a fuel pump, a main fuel line connected to said pump for feeding the turbine with fuel, means connected to the turbine shaft and responsive to changes in turbine speed, fuel regulating means having a fuel flow metering device inserted in said line and controlled by said speed responsive means for varying the rate at which fuel is supplied to said turbine so as to maintain a predetermined constant turbine working speed after starting, means in the turbine responsive to variation in the turbine temperature, means connected to said temperature responsive means for continuously comparing the actual turbine temperature with an upper limit corresponding to the maximum permissible temperature for the turbine, means for determining the maximum rate of fuel flow for said turbine, means connected to said determining means and to said main line for continuously comparing the actual rate of fuel flow for said turbine through said line with upper and lower limits respectively corresponding to the theoretical maximum and minimum rates of fuel flow for said turbine, means connected to said main line for detecting a zeroizing of the fuel feeding in flight, means for continuously detecting the thrust of the propeller, electric motor means for varying the pitch of the propeller, a first normally open electric circuit connected to said motor means for inducing when closed movement of said motor means for decreasing said pitch, a second normally open electric circuit connected to said motor means for inducing when closed a movement of said motor means for increasing said pitch, a main electric line for feeding said first and second circuits, first contact means controlled by said temperature and rate of fuel flow comparing means for maintaining the second circuit opened and for closing the first one as soon and as long as the first one of the actual turbine temperature and of the actual rate of fuel flow tends to exceed its upper limit for automatically decreasing the blade pitch down to a positive predetermined value, second contact means controlled by said rate of fuel flow comparing, propeller thrust detecting, and fuel feeding detecting means for maintaining the first circuit opened and for closing the second one as soon as the first one of the difference between the actual rate of fuel flow and its lower limit, of the propeller thrust and of the fuel feeding for the turbine in flight tends to a zero value for automatically increasing the blade pitch, means for manually controlling the pitch between maximum reverse and feathering, two auxiliary electric lines respectively connecting said pitch controlling means to said first circuit and to the first contact means, means interconnecting said motor means and said manual pitch controlling means for indicating by the position of said last means the actual pitch attained under the action of the closures of said first and second circuits, means for rendering inoperative said motor means as soon as maximum reverse and feathering are attained, means for indicating the values of the actual and theoretical maximum and minimum rates of fuel flow, means for rendering inoperative said first contact means as soon as the decreasing pitch attains said predetermined positive value, means controlled by the first circuit for suppressing the action of a fuel feeding tending to on said second contact means as long as a pitch decreasing is manually controlled, means for modifying the rate of fuel flow for any controlled increasing and decreasing of the pitch in order to immediately set up the turbine working speed at a value slightly greater and smaller than that corresponding to the desired pitch variation, respectively, and means connected to said second normally open circuit for closing the latter and automatically increasing the blade pitch until maximum loading is attained for the turbine as long as the actual turbine temperature and rate of fuel flow are respectively less than their upper limits.

37. A control system, according to claim 36, wherein the means for detecting the thrust of the propeller comprises means sensitive to the difference between the air pressure sampled behind the propeller and the total air head sampled clear of the surface swept by the propeller, a pitch indicator having a dial graduated for positive, negative and zero thrusts and a pointer displaceable with respect to said dial and controlled by said means sensitive to said differential air pressure, and a normally open contact connected in parallel across the main electric line and the auxiliary electric line connecting the pitch controlling means and the first contact means, said normally open contact being controlled by said means sensitive to said differential air pressure to be closed as soon as the propeller thrust attains a zero value.

38. A control system for the propelling powerplant of a helicopter having a gas turbine and a rotor with variable pitch blades driven thereby, comprising, in combination, means sensitive to the turbine speed and to the quantity of fuel delivered to the turbine for maintaining it at a constant working rotational speed without any action of the pilot, means for varying the general pitch of the rotor blades between the zero pitch and the maximum permissible pitch, means for limiting any increase in the turbine temperature and in the rate of fuel flow to the maximum permissible temperature and theoretical rate of fuel flow for said turbine, respectively, means for limiting any decrease in the rate of fuel flow to the theoretical minimum rate of fuel flow for said turbine, means for preventing any overspeeding for said turbine in the case of a fuel feeding in flight tending to zero, and a hand-operated lever connected to said pitch varying means for manually controlling said last means, whereby all the manoeuvres of the helicopter between take-off and landing are only effected under the action of the pilot on said hand-operated lever.

39. A control system for the propelling powerplant of an aircraft having a gas turbine and a variable pitch propeller driven thereby, comprising, in combination, means for starting the turbine and for setting it at its working rotational speed, means sensitive to the turbine speed and to the quantity of fuel delivered to the turbine for maintaining it at a constant working rotational speed without any action of the pilot, means for varying the pitch of the propeller between maximum reverse and feathering, a first means for limiting any increase in the turbine temperature and in the rate of fuel flow to the maximum permissible temperature and theoretical rate of fuel flow for said turbine, respectively, a second means for limiting any decrease in the rate of fuel flow to the theoretical minimum rate of fuel flow for said turbine, means for preventing any overspeeding for said turbine in the case of a fuel feeding in flight tending to zero, means for limiting in flight any decrease of the propeller thrust to a zero value, means connected to said pitch varying means and controlled by said first and second limiting means for automatically controlling said pitch varying means as long as the actual turbine temperature is less than said maximum permissible temperature for said turbine and as long as the rate of fuel flow is comprised between said theoretical maximum and minimum rates of fluid flow, and a hand-operated lever connected to said pitch varying means for manually controlling said last means, whereby all the manoeuvres of the aircraft between take-off and landing are only effected under the action of the pilot on said hand-operated lever.

References Cited in the file of this patent

UNITED STATES PATENTS

| | | |
|---|---|---|
| 2,613,029 | Wilde | Oct. 7, 1952 |
| 2,645,293 | Ogle | July 14, 1953 |
| 2,857,739 | Wright | Oct. 28, 1958 |
| 3,025,670 | Russ | Mar. 20, 1962 |
| 3,034,583 | Best | May 15, 1962 |